United States Patent
Sun et al.

(10) Patent No.: US 11,977,969 B2
(45) Date of Patent: May 7, 2024

(54) DATA LOADING

(71) Applicant: Hangzhou Zhicun Intelligent Technology Co., Ltd., Hangzhou (CN)

(72) Inventors: Xuguang Sun, Hangzhou (CN); Xiaodi Xing, Hangzhou (CN); Shaodi Wang, Hangzhou (CN)

(73) Assignee: HANGZHOU ZHICUN INTELLIGENT TECHNOLOGY CO., LTD., Hangzhou (CN)

( * ) Notice: Subject to any disclaimer, the term of this patent is extended or adjusted under 35 U.S.C. 154(b) by 897 days.

(21) Appl. No.: 17/030,229

(22) Filed: Sep. 23, 2020

(65) Prior Publication Data

US 2021/0390379 A1    Dec. 16, 2021

Related U.S. Application Data

(63) Continuation of application No. PCT/CN2020/096937, filed on Jun. 19, 2020.

(30) Foreign Application Priority Data

Jun. 11, 2020   (CN) .......................... 202010526945.2

(51) Int. Cl.
| | | |
|---|---|---|
| G06F 40/00 | (2020.01) | |
| G06F 9/30 | (2018.01) | |
| G06F 9/445 | (2018.01) | |
| G06F 9/48 | (2006.01) | |
| G06N 3/063 | (2023.01) | |

(52) U.S. Cl.
CPC ......... *G06N 3/063* (2013.01); *G06F 9/30127* (2013.01); *G06F 9/445* (2013.01); *G06F 9/4843* (2013.01)

(58) Field of Classification Search
CPC ..... G06N 3/063; G06F 9/30127; G06F 9/445; G06F 9/4843
See application file for complete search history.

(56) References Cited

U.S. PATENT DOCUMENTS

| | | | |
|---|---|---|---|
| 10,572,225 B1 | 2/2020 | Ghasemi et al. | |
| 11,003,985 B2 * | 5/2021 | Kim | G06F 7/5443 |

(Continued)

FOREIGN PATENT DOCUMENTS

| | | |
|---|---|---|
| CN | 106940815 A | 7/2017 |
| CN | 109409512 A | 3/2019 |

(Continued)

OTHER PUBLICATIONS

Zhang, H.; Wu, X.; Du, Y.; Guo, H.; Li, C.; Yuan, Y.; Zhang, M.; Zhang, S. A Heterogeneous RISC-V Processor for Efficient DNN Application in Smart Sensing System. Sensors 2021, 21, 6491. https://doi.org/10.3390/s21196491. (Year: 2021).*

(Continued)

*Primary Examiner* — Barbara M Level
(74) *Attorney, Agent, or Firm* — Morgan, Lewis & Bockius LLP

(57) ABSTRACT

A data loading circuit and method are provided. The circuit is configured to load data for a feature map calculated by a neural network into a calculation circuit, wherein the size of the convolution kernel of the neural network is K*K data, and a window corresponding to the convolution kernel slides with a step size of S in the feature map, where K and S are positive integers and S<K, the circuit comprising: two data loaders comprising a first data loader and a second data loader; and a controller configured to: control the first data loader to be in a data outputting mode and control the second data loader to be in a data reading mode, when the window slides within K consecutive rows of the feature map.

18 Claims, 13 Drawing Sheets

(56) References Cited

U.S. PATENT DOCUMENTS

| | | | |
|---|---|---|---|
| 11,216,375 B2* | 1/2022 | Zheng | G06F 12/0802 |
| 11,514,136 B2* | 11/2022 | Wen | G06N 3/045 |
| 2018/0137407 A1* | 5/2018 | Du | G06N 3/063 |
| 2018/0189642 A1* | 7/2018 | Boesch | G06F 30/327 |
| 2019/0164045 A1 | 5/2019 | Li et al. | |
| 2020/0167405 A1* | 5/2020 | Suk | G06F 17/153 |

FOREIGN PATENT DOCUMENTS

| | | |
|---|---|---|
| CN | 110046702 A | 7/2019 |
| CN | 110322001 A | 10/2019 |
| CN | 110399976 A | 11/2019 |
| CN | 110705687 A | 1/2020 |
| CN | 110807522 A | 2/2020 |

OTHER PUBLICATIONS

Ziaul Choudhury, Shashwat Shrivastava, Lavanya Ramapantulu, and Suresh Purini. 2022. An FPGA Overlay for CNN Inference with Fine-grained Flexible Parallelism. ACM Trans. Archit. Code Optim. 19, 3, Article 34 (Sep. 2022), 26 pages. https://doi.org/10.1145/3519598. (Year: 2022).*

Yufei Ma, N. Suda, Yu Cao, J. - s. Seo and S. Vrudhula, Scalable and modularized RTL compilation of Convolutional Neural Networks onto FPGA, 2016 26th International Conference on Field Programmable Logic and Applications (FPL), Lausanne, Switzerland, 2016, pp. 1-8, doi: 10.1109/FPL.2016.7577356. (Year: 2016).*

Brownlee, Jason, How Do Convolutional Layers Work in Deep Learning Neural Networks? Machine Learning Mastery, Apr. 17, 2020. Archive May 5, 2020 retrieved https://web.archive.org/20200505100715/https://machinelearningmastery.com/convolutional-layers-for-deep-learning-neural-networks. 21 pages. (Year: 2020).*

Han Kun Law Office, ISR, PCT/CN2020/096937, Mar. 10, 2021, 2 pgs.

Hangzhou Zhicun Intelligent Technology Co., Ltd., Written Opinion, PCT/CN2020/096937, Mar. 10, 2021, 3 pgs.

Hangzhou Zhicun Intelligent Technology Co., Ltd., IPRP, PCT/CN2020/096937, Dec. 13, 2022, 4 pgs.

* cited by examiner

DATA LOADING

RELATED APPLICATIONS

The present application is a continuation of PCT Application PCT/CN2020/096937, filed on Jun. 19, 2020, which claims priority to Chinese patent application No. 202010526945.2 filed on Jun. 11, 2020. The content of each of the foregoing applications is hereby incorporated by reference in its entirety for all purposes.

TECHNICAL FIELD

The present disclosure relates to data loading, and in particular to data loading for neural network calculations.

BACKGROUND

The neural network is the core of artificial intelligence technologies. Currently, the neural network has been extensively studied and has drawn much attention, which is applied in the field of artificial intelligence applications including computer vision, speech recognition, robots, autonomous driving, etc.

In practical applications, the neural network usually has a very large number of hierarchies which is even up to thousands of hierarchies, and therefore, the amount of input data and intermediate data is also extremely huge. Usually, data for a feature map calculated by a neural network is stored in a memory outside a calculation circuit, and therefore, the data in the feature map needs to be loaded into the calculation circuit before or during the calculation by the calculation circuit. Due to the large amount of data to be loaded and the limited speed of reading data from the memory, the data loading problem of the neural network is the bottleneck for its speed and energy efficiency.

The methods described in this section are not necessarily methods that have been previously conceived or employed. It should not be assumed that any of the methods described in this section are considered to be the prior art just because they are included in this section, unless otherwise indicated expressly. Similarly, the problem mentioned in this section should not be considered to be universally recognized in any prior art, unless otherwise indicated expressly.

SUMMARY

According to an aspect of the present disclosure, a data loading circuit is provided. The circuit is configured to load data for a feature map calculated by a neural network into a calculation circuit, wherein the size of the convolution kernel of the neural network is K*K data, and a window corresponding to the convolution kernel slides at a step of S (i.e., with a step size of S) in the feature map, where K and S are positive integers and S<K, the circuit comprising: two data loaders comprising a first data loader and a second data loader; and a controller configured to: control the first data loader to be in a data outputting mode and control the second data loader to be in a data reading mode, when the window slides within K consecutive rows of the feature map, wherein the first data loader in the data outputting mode is configured to output data in a matrix corresponding to the window to the calculation circuit, and output data in the last (K−S) columns of the matrix corresponding to the window to the second data loader in the data reading mode, and the second data loader in the data reading mode is configured to receive data from the first data loader in the data outputting mode, and read, from a memory, data in S columns after the matrix corresponding to the window in the K consecutive rows.

According to another aspect of the present disclosure, a data loading method is provided. The method comprises loading data for a feature map calculated by a neural network into a calculation circuit, wherein the size of the convolution kernel of the neural network is K*K data, and a window corresponding to the convolution kernel slides at a step of S in the feature map, where K and S are positive integers and S<K, the method comprising: controlling the first data loader to be in a data outputting mode and controlling the second data loader to be in a data reading mode, when the window slides within K consecutive rows of the feature map, wherein the first data loader in the data outputting mode outputs data in a matrix corresponding to the window to the calculation circuit, and outputs data in the last (K−S) columns of the matrix corresponding to the window to the second data loader in the data reading mode, and the second data loader in the data reading mode receives data from the first data loader in the data outputting mode, and reads, from a memory, data in S columns after the matrix corresponding to the window in the K consecutive rows.

BRIEF DESCRIPTION OF THE DRAWINGS

Embodiments are shown exemplarily in the accompanying drawings and form part of the specification together with a written description of the specification to explain the exemplary implementations of the embodiments. The embodiments shown are merely for illustrative purposes and do not limit the scope of the claims. Throughout the drawings, like reference signs denote like but not necessarily identical elements.

DETAILED DESCRIPTION OF EMBODIMENTS

In the present disclosure, unless otherwise stated, the terms "first", "second", etc., used to describe various elements are not intended to limit the positional, temporal or importance relationship of these elements, but rather only to distinguish one component from the other. In some examples, the first element and the second element may point to the same instance of the element, and in some cases, based on contextual descriptions, they may also refer to different instances.

The terms used in the description of the various examples in the present disclosure are merely for the purpose of describing particular examples, and are not intended to be limiting. If the number of elements is not specifically defined, it may be one or more, unless otherwise expressly indicated in the context. Moreover, the term "and/or" used in the present disclosure encompasses any of and all possible combinations of listed items.

The neural network used in practical applications may be a deep neural network (DNN). The deep neural network comprises an input layer, several hidden layers (intermediate layers), and an output layer. The input layer receives input data (for example, pixel data of an image, amplitude data of audio, etc.), performs preprocessing (for example, de-meaning, normalization, principal component analysis (PCA) dimension reduction, etc.) on the input data, and conveys the preprocessed data to a hidden layer. Each of the several hidden layers receives data from the previous layer, performs calculation on the received data, and then conveys the calculated data to the next layer, wherein a hidden layer may be, for example, a convolutional layer or a pooling layer. The output layer receives data from the last hidden layer, performs calculation on the received data, and then outputs a calculated result, wherein the output layer may be, for example, a fully connected layer. A convolutional neural network (CNN) is an example of a deep neural network in which the hidden layers comprise at least one convolutional layer.

Figure 1:
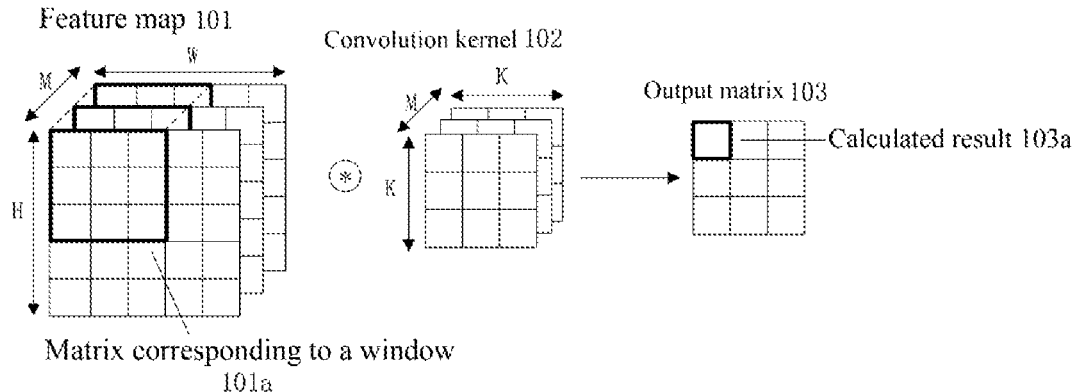
FIG. 1 is a schematic diagram showing calculation at a convolutional layer in a convolutional neural network, in accordance with some embodiments, such as an exemplary embodiment.

FIG. 1 is a schematic diagram showing calculation at a convolutional layer in a convolutional neural network in accordance with some embodiments, such as an exemplary embodiment. As shown in FIG. 1, a convolution calculation is performed between a feature map 101 and a convolution kernel 102 to obtain an output matrix 103, wherein the convolution calculation is represented by a symbol ⊛ in FIG. 1.

According to some embodiments, the feature map 101 is a three-dimensional matrix with a height of H, a width of W, and a number of channels of M. The three-dimensional matrix is constituted by M layers with a height of H and a width of W. H, W and M are positive integers, respectively, and H and W may be the same or may be different. For example, the feature map in FIG. 1 is a three-dimensional matrix with a height of 5, a width of 5, and a number of channels of 3. However, it should be understood that FIG. 1 is merely exemplary, and the height, width, and number of channels of the feature map are not limited thereto. According to some embodiments, the feature map is data input to the convolutional layer by an input layer or a previous hidden layer.

For ease of description, each group of data in the width direction of the three-dimensional matrix is referred to as a row of the three-dimensional matrix, and addresses in the width direction of the three-dimensional matrix are referred to as column addresses; and each group of data in the height direction of the three-dimensional matrix is referred to as a column of the three-dimensional matrix, and addresses in the height direction of the three-dimensional matrix are referred to as row addresses. However, it should be understood that, alternatively, each group of data in the height direction of the three-dimensional matrix may be referred to as a row of the three-dimensional matrix, and each group of data in the width direction of the three-dimensional matrix may be referred to as a column of the three-dimensional matrix.

For ease of description, it is specified that the row address and the column address in the three-dimensional matrix start from the address "0", a row with a row address of i is the $i^{th}$ row, and a column with a column address of j is the $j^{th}$ column; and it is specified that the direction in which column addresses in the three-dimensional matrix sequentially increase is the row direction, and the direction in which row addresses in the three-dimensional matrix sequentially increase is the column direction.

For ease of description, it is specified that the column addresses in the three-dimensional matrix sequentially increase from left to right, and the row addresses sequentially increase from top to bottom. However, it should be understood that, alternatively, it may be specified that the column addresses in the three-dimensional matrix sequentially increase from right to left, and the row addresses in the three-dimensional matrix sequentially increase from bottom to top. In addition, it should be understood that, when each group of data in the height direction of the three-dimensional matrix is referred to as a row of the three-dimensional matrix, and the data in the width direction of the three-dimensional matrix is referred to as a column of the three-dimensional matrix, it may be specified that the column addresses in the three-dimensional matrix sequentially increase from top to bottom or from bottom to top, and the row addresses in the three-dimensional matrix sequentially increase from left to right or from right to left.

For ease of description, when the height of the three-dimensional matrix is h, and the width thereof is w, the $0^{th}$ row to the $(i-1)^{th}$ row of the three-dimensional matrix are referred to as the first i rows of the three-dimensional matrix and the $(h-i-1)^{th}$ row to the $(h-1)^{th}$ row of the three-dimensional matrix are referred to as the last i rows of the three-dimensional matrix, while the $0^{th}$ column to the $(j-1)^{th}$ column of the three-dimensional matrix are referred to as the first j rows of the three-dimensional matrix and the $(w-j-1)^{th}$ column to the $(w-1)^{th}$ column of the three-dimensional matrix are referred to as the last j columns of the three-dimensional matrix.

According to some embodiments, the convolution kernel 102 is a three-dimensional matrix with a height of K, a width of K, and a number of channels of M, wherein in order to perform a convolution calculation, the number of channels of the convolution kernel 102 should be the same as the number of channels of the feature map 101. For example, the convolution kernel in FIG. 1 is a three-dimensional matrix with a height of 3, a width of 3, and a number of channels of 3. However, it should be understood that FIG. 1 is merely exemplary, and the height, width, and number of channels of the convolution kernel are not limited thereto. In addition, although the example in FIG. 1 shows only one convolution kernel, it should be understood that FIG. 1 is merely exemplary, and the number of convolution kernels in the convolutional neural network is not limited thereto.

For ease of description, (height×width) is used in the present disclosure to describe the size of the feature map and the size of the convolution kernel, for example, the size of the feature map in FIG. 1 is 5×5 data and the size of the convolution kernel is 3×3 data.

A convolution calculation is performed between the feature map 101 and the convolution kernel 102 to obtain an output matrix 103. In particular, a window corresponding to the convolution kernel slides at a step of S in the feature map 101 in the height or width direction, where the step S is a positive integer, and S is less than K. It is noted that the phrase "slides at a step of S" means slides (or advances) with a step size of S. In some embodiments, S may be 1. In some other embodiments, S may be greater than 1. At each position to which the window slides in the feature map 101, a convolution calculation is performed between the three-dimensional matrix of data in the feature map 101 that corresponds to the window and the convolution kernel 102 so as to obtain various elements in the output matrix 103. Performing a convolution calculation between the matrix corresponding to the window (i.e., the window correspondence matrix) 101a and the convolution kernel 102 is as follows: elements of the matrix corresponding to the window 101a are multiplied by elements of the convolution kernel 102 that are at corresponding positions, and then all the products are added to obtain calculated results 103a in the output matrix 103.

FIGS. 2a to 2e are schematic diagrams showing the sliding of a window corresponding to a convolution kernel in a feature map in accordance with some embodiments, such as an exemplary embodiment. For ease of description, only a two-dimensional plane corresponding to the height and the width is drawn in FIGS. 2a to 2e, but it should be understood that a matrix corresponding to the window may be a three-dimensional matrix constituted by data at window positions in all layers of the feature map.

Figure 2A:
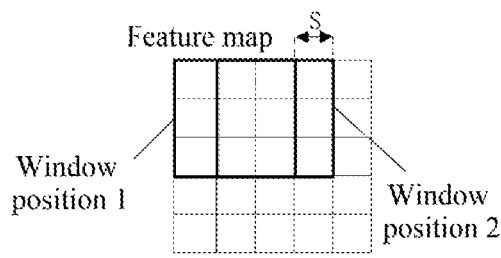
FIGS. 2a to 2e are schematic diagrams showing the sliding of a window corresponding to a convolution kernel in a feature map, in accordance with some embodiments, such as an exemplary embodiment.
Figure 2B:
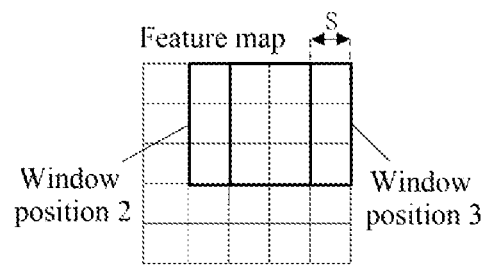

According to some embodiments, K consecutive rows of the feature map are selected, and then the window slides in the row direction within the K consecutive rows. FIGS. 2a to 2b are schematic diagrams showing the sliding of the window within the K consecutive rows.

FIG. 2a is a schematic diagram showing the window starting to slide within the K consecutive rows. As shown in FIG. 2a, when the window starts to slide in the $0^{th}$ row to the $(K-1)^{th}$ row of the feature map, the window is at a window position 1, and the matrix corresponding to the window is the $0^{th}$ column to the $(K-1)^{th}$ column in the $0^{th}$ row to the $(K-1)^{th}$ row of the feature map, and when the window slides one time in the row direction at a step of S (in this example, S=1), the window is at a window position 2, and the matrix corresponding to the window is the $S^{th}$ column to the $(K+S-1)^{th}$ column in the $0^{th}$ row to the $(K-1)^{th}$ row of the feature map. The last (K−S) columns of the matrix corresponding to the window at the window position 1 overlap with the first (K−S) columns of the matrix corresponding to the window at the window position 2, which are both the $S^{th}$ column to the $(K-1)^{th}$ column in the $0^{th}$ row to the $(K-1)^{th}$ row of the feature map.

FIG. 2b is a schematic diagram showing the window continuing to slide within the K consecutive rows. As shown in FIG. 2b, when the window is at the window position 2, which is the same as that described with reference to FIG. 2a, the matrix corresponding to the window at the window position 2 is the $S^{th}$ column to the $(K+S-1)^{th}$ column in the $0^{th}$ row to the $(K-1)^{th}$ row of the feature map, and when the window slides one time again in the row direction at the step of S, the window is at a window position 3, and the matrix corresponding to the window is the $2S^{th}$ column to the $(K+2S-1)^{th}$ column in the $0^{th}$ row to the $(K-1)^{th}$ row of the feature map. The last (K−S) columns of the matrix corresponding to the window at the window position 2 overlap with the first (K−S) columns of the matrix corresponding to the window at the window position 3, which are both the $2S^{th}$ column to the $(K+S-1)^{th}$ column in the $0^{th}$ row to the $(K-1)^{th}$ row of the feature map.

According to some other embodiments, after the window has slid to the end of the K consecutive rows, the sliding of the window within the current K rows ends and a sliding within reselected K rows starts. The reselected K rows comprise the last (K−S) rows in the current K rows and S rows after the K consecutive rows in the feature map. In the present disclosure, "the window has slid to the end of the K consecutive rows" means that if the window continues to slide in the row direction with a step size of S, the window will go beyond the range of the feature map. In some cases, when the window has slid such that the last column of the matrix corresponding to the window overlaps with the last column of the feature map, the window has slid to the end of the K rows. In some other cases, if although the last column of the matrix corresponding to the window has not yet overlapped with the last column of the feature map, the difference between the column address of the last column of the feature map and the column address of the last column of the matrix corresponding to the window has been less than S, then the window has also slid to the end of the K rows, in that if the window continues to slide at the step of S, the window will go beyond the range of the feature map. "After the window has slid to the end of the K consecutive rows" means that the sliding operation of the window to the end of the K rows and the corresponding data output operation have been completed.

Figure 2C:
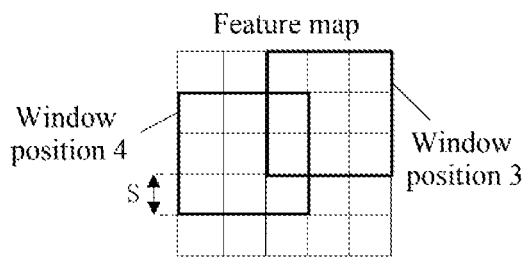

FIG. 2c is a schematic diagram showing the window sliding across rows. As shown in FIG. 2c, after the window has slid to the end of the K consecutive rows (the window position 3 corresponding to the last K columns in the current K rows), the sliding in the current K rows ends, and the last (K−S) rows in the current K rows and S rows after the K consecutive rows in the feature map, namely, the $S^{th}$ row to the $(K+S-1)^{th}$ row of the feature map, are reselected. The window moves from the original window position 3 to a window position 4, and starts to slide within the reselected K consecutive rows.

Figure 2D:
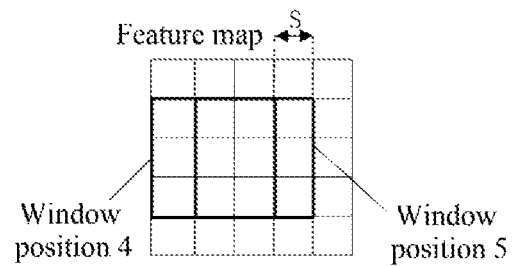

FIG. 2d is a schematic diagram showing the window sliding within the reselected K rows. When the window is at the window position 4, a matrix corresponding to the window at the window position 4 is the $0^{th}$ column to the $(K-1)^{th}$ column in the $S^{th}$ row to the $(K+S-1)^{t}$ row of the feature map, and when the window slides one time in the row direction at the step of S, the window is at a window position 5, and a matrix corresponding to the window is the $S^{th}$ column to the $(K+S-1)^{th}$ column in the $S^{th}$ row to the $(K+S-1)^r$ row of the feature map. The last (K−S) columns of the matrix corresponding to the window at the window position 4 overlap with the first (K−S) columns of the matrix corresponding to the window at the window position 5, which are both the $S^{th}$ column to the $(K-1)^{th}$ column in the $S^{th}$ row to the $(K+S-1)^{th}$ row of the feature map.

According to some other embodiments, after the window has slid to the end of the feature map, the sliding of the window in feature map ends. In the present disclosure, "the window has slid to the end of the feature map" means that if the window continues to slide either in the row direction or the column direction at the step of S, the window will go beyond the range of the feature map. In some cases, when the window has slid such that the last row of the matrix corresponding to the window overlaps with the last row of the feature map and the window has slid to the end of the K rows, the window has slid to the end of the feature map. In some other cases, if although the last row of the matrix corresponding to the window has not yet overlapped with the last row of the feature map after the window has slid to the end of the K rows, the difference between the row address of the last row of the feature map and the row address of the last row of the matrix corresponding to the window has been less than S, the window has also slid to the end of the feature map, in that if the window continues to slide in the column direction at the step of S, the window will go beyond the range of the feature map. "After the window has slid to the end of the feature map" means that the sliding operation of the window to the end of the feature map and a corresponding data output operation have been completed.

Figure 2E:
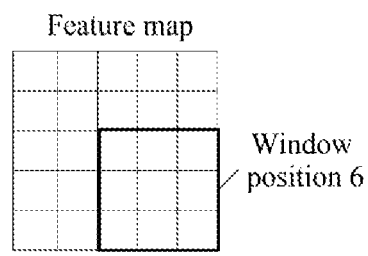

FIG. 2e is a schematic diagram showing the window having slid to the end of the feature map. When the window is at a window position 6, the window has slid to the end of the last K rows of the feature map, and the sliding in the feature map ends. Although the examples in FIGS. 2a to 2e show that the window sliding has a step of 1, it should be understood that FIG. 2 is merely exemplary, and the step of window sliding in the convolutional neural network is not limited thereto.

Figure 3:
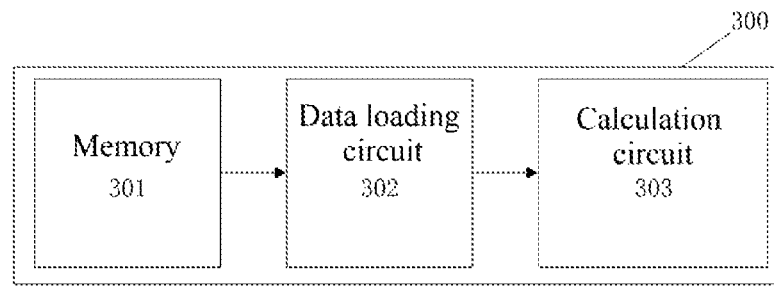
FIG. 3 shows a structural block diagram of a system for neural network calculation, in accordance with some embodiments, such as an exemplary embodiment.

FIG. 3 shows a structural block diagram of a system 300 for neural network calculation in accordance with some embodiments, such as an exemplary embodiment. As shown in FIG. 3, the calculation system 300 comprises a memory 301, a data loading circuit 302, and a calculation circuit 303. The memory 301 stores input data for neural network calculation, and the data loading circuit 302 reads data from the memory 301 and loads the read data into the calculation circuit 303.

According to some embodiments, the memory 301 stores data for a feature map calculated by the neural network, and the calculation circuit 303 is loaded with data of the convolution kernel of the neural network. According to some embodiments, the data loading circuit 302 sequentially outputs data in a matrix corresponding to the window to the calculation circuit 303, and the calculation circuit 303 performs calculation between the received matrix corresponding to the window and the loaded convolution kernel so as to obtain various calculated results in the output matrix.

The calculation speed and the energy consumption are two important indicators for the computing system 300. Due to limitations of the bandwidth of memory and data addressing logic, the speed of reading data from the memory 301 may be the bottleneck of the calculation speed of the computing system 300. In addition, the energy consumption caused by reading data from the memory 301 accounts for a relatively high proportion of the total energy consumption of the computing system 300. Therefore, reducing the amount of data read from the memory 301 is very important for increasing the calculation speed of the system 300 and reducing the energy consumption of the system 300. In the present disclosure, by increasing the reusability of the input feature map of the neural network, the amount of data read from the memory 301 is reduced.

According to an embodiment of the present disclosure, the data loading circuit is configured to load data for a feature map calculated by a neural network into a calculation circuit, wherein the size of the convolution kernel of the neural network is K*K data, and a window corresponding to the convolution kernel slides at a step of S in the feature map, where K and S are positive integers and S<K. According to some embodiments, the feature map of the neural network may have M channels, where M is a positive integer. The circuit comprises: two data loaders comprising a first data loader and a second data loader; and a controller configured to: control the first data loader to be in a data outputting mode and control the second data loader to be in a data reading mode, when the window slides within K consecutive rows of the feature map, wherein the first data loader in the data outputting mode is configured to output data in a matrix corresponding to the window to the calculation circuit, and output data in the last (K−S) columns of the matrix corresponding to the window to the second data loader in the data reading mode, and the second data loader in the data reading mode is configured to receive data from the first data loader in the data outputting mode, and read, from a memory, data in S columns after the matrix corresponding to the window in the K consecutive rows.

Figure 4:
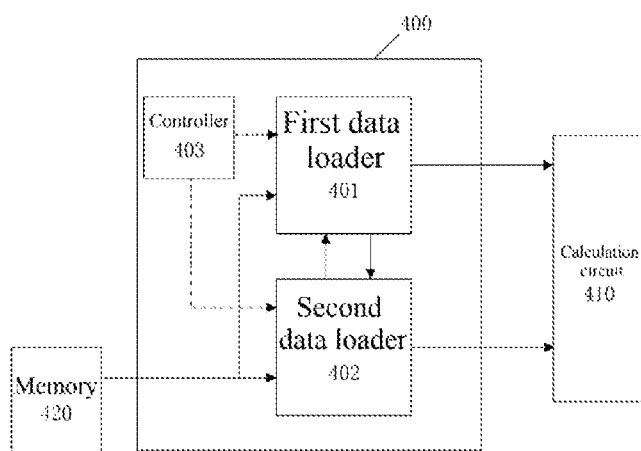
FIG. 4 shows a structural block diagram of a data loading circuit in accordance with some embodiments, such as an exemplary embodiment of the present disclosure.

FIG. 4 shows a structural block diagram of a data loading circuit 400 in accordance with some embodiments, such as an exemplary embodiment of the present disclosure. The data loading circuit 400 comprises a first data loader 401, a second data loader 402, and a controller 403.

According to some embodiments, when a window slides within K consecutive rows, one of the first data loader 401 or the second data loader 402 is in a data outputting mode, and the other is in a data reading mode. According to some embodiments, the data loader in the data outputting mode outputs data in a matrix corresponding to the window to a calculation circuit 410, and outputs data in the last (K−S) columns of the matrix corresponding to the current window to the data loader in the data reading mode; and the data loader in the data reading mode receives the data from the data loader in the data outputting mode, and reads, from a memory 420, data in S columns after the matrix corresponding to the current window in the K consecutive rows.

According to some embodiments, the first data loader 401 and the second data loader 402 has the same circuit structure.

FIGS. 5a to 5e are schematic diagrams showing the state of the data loading circuit 400 when the convolution kernel of a neural network slides in a feature map in accordance with some embodiments, such as an exemplary embodiment of the present disclosure. In FIGS. 5a to 5e, the bold solid line indicates that the data loaders 401 and 402 receive or output data through a data path corresponding to the line. It should be understood that, for ease of description, the data path that does not convey data at the current moment is not shown in FIGS. 5a to 5e.

Figure 5A:
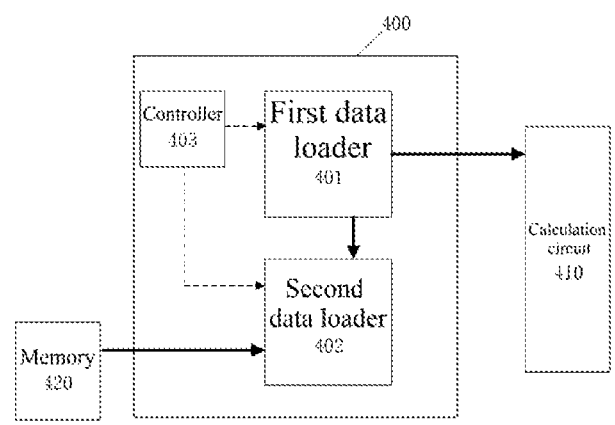
FIGS. 5a to 5e are schematic diagrams showing the state of a data loading circuit when the convolution kernel of a neural network slides in a feature map in accordance with some embodiments, such as an exemplary embodiment of the present disclosure.

FIG. 5a shows the state of the data loading circuit 400 when the window slides within K consecutive rows of the feature map. The first data loader 401 is in a data outputting mode and the second data loader 402 is in a data reading mode.

According to some embodiments, when a window corresponding to the convolution kernel slides within the K consecutive rows with a step size of S, the matrix corresponding to the window is K consecutive columns in the K consecutive rows. For each sliding of the window within the K consecutive rows, if the matrix corresponding to the window before the sliding is the $j^{th}$ column to the $(j+K-1)^{th}$ column (where j is a positive integer or 0, and j≤(W−K−S+1)) in the K consecutive rows, the matrix corresponding to the window after the sliding is the (j+Sr column to the $(j+K+S-1)^{th}$ column in the K consecutive rows. Therefore, the first (K−S) columns of the matrix corresponding to the window after the sliding (namely, the $0^{th}$ column to the $(K-S-1)^{th}$ column of the matrix corresponding to the window after the sliding) overlap with the last (K−S) columns of the matrix corresponding to the window before the sliding (namely, the $S^{th}$ column to the $(K-1)^{th}$ column of the matrix corresponding to the window before the sliding), which are both the $(j+S)^{th}$ column to the $(j+K-1)^{th}$ column in the K consecutive rows; and the last S columns of the matrix corresponding to the window after the sliding (namely, the $(K-S)^{th}$ column to the $(K-1)^{th}$ column of the matrix corresponding to the window after the sliding) is the $(j+K)^{th}$ column to the $(j+K+S-1)^{th}$ column in the K consecutive rows, namely, S columns after the matrix corresponding to the window in the K consecutive rows.

As shown in FIG. 5a, the first data loader 401 outputs the matrix corresponding to the current window to a calculation circuit 410, and outputs the last (K−S) columns of the matrix corresponding to the current window to the second data loader 402, namely, the first (K−S) columns of the matrix corresponding to the window after the sliding of the window; and the second data loader 402 receives data from the first data loader 401, and reads, from the memory 420, S columns after the matrix corresponding to the window before the sliding in the K consecutive rows, namely, the last S columns of the matrix corresponding to the window after the sliding of the window. Therefore, the last (K−S) columns of the matrix corresponding to the current window are output to the second data loader 402 in the data reading mode, such that the second data loader 402 only needs to read the last S columns of the matrix corresponding to the window after the sliding instead of repeatedly reading this part of data from the memory 420, which increases the reusability of the input feature map of the neural network, and then reduces the amount of data read from the memory 420.

According to some embodiments, the second data loader 402 reads data in the memory 420 while receiving data from the first data loader 401, to reduce a data reading delay caused by reading the data from the memory 420.

According to an embodiment of the present disclosure, the controller is further configured to: determine, after the second data loader in the data reading mode completes the process of receiving the data from the first data loader in the data outputting mode and reading the data from the memory, whether the difference between the column address of the last column of the feature map and the column address of the last column of the matrix corresponding to the window is greater than or equal to 2S, wherein if (e.g., in accordance with a determination, for example by the controller, that) the difference between the column address of the last column of the feature map and the column address of the last column of the matrix corresponding to the window is greater than or equal to 2S, data stored in the first data loader in the data outputting mode is cleared, the first data loader in the data outputting mode is controlled to switch to the data reading mode, and the second data loader in the data reading mode is controlled to switch to the data outputting mode.

In the case shown in FIG. 5a, since the speed at which the first data loader 401 outputs data to the calculation circuit 410 and the second data loader 402 is much higher than the speed at which the second data loader 402 reads data from the memory 420, when the second data loader 402 in the data reading mode completes the process of receiving the data from the first data loader 401 in the data outputting mode and reading the data from the memory 420, the first data loader 401 has completed the process of outputting the data to the calculation circuit 410 and the second data loader 402. Therefore, when it is determined that the second data loader 402 in the data reading mode completes the process of receiving the data from the first data loader 401 and reading the data from the memory 420, the first data loader 401 has output the matrix corresponding to the current window to the calculation circuit 410, and the second data loader 402 has received the matrix corresponding to the window after the sliding and is ready to output the matrix to the calculation circuit 410 later.

According to some embodiments, if the window after the sliding has not slid to the end of the K consecutive rows, the window will continue to slide in the row direction within the K consecutive rows. In this case, the difference between the column address of the last column of the feature map and the column address of the last column of the matrix corresponding to the window after the sliding is greater than or equal to S. Since the difference between the column address of the last column of the matrix corresponding to the window after the sliding and the column address of the last column of the matrix corresponding to the window before the sliding is S, when the difference between the column address of the last column of the feature map and the column address of the last column of the matrix corresponding to the window before the sliding is greater than or equal to 2S, the window will continue to slide in the row direction within the K consecutive rows after completing this sliding.

Figure 5B:
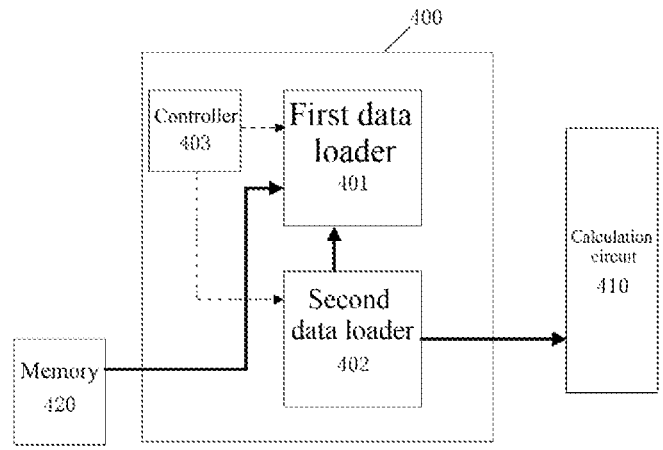

FIG. 5b shows the state of the data loading circuit 400 when the window continues to slide within K consecutive rows of the feature map. In this case, the first data loader 401 switches to the data reading mode and the second data loader 402 switches to the data outputting mode. The second data loader 402 outputs data in the matrix corresponding to the current window to the calculation circuit 410, and outputs data in the last (K−S) columns of the matrix corresponding to the current window to the first data loader 401; and the first data loader 401 receives the data from the second data loader 402, and reads, from the memory 420, data in S columns after the matrix corresponding to the window in the K consecutive rows.

According to some embodiments, similar to that described with reference to FIG. 5a, when it is determined that the first data loader 401 in the data reading mode completes the process of receiving the data from the second data loader 402 and reading the data from the memory 420, the second data loader 402 has output the matrix corresponding to the current window to the calculation circuit 410, and the first data loader 401 has received the matrix corresponding to the window after sliding again. If the window may further continue to slide in the row direction within the K consecutive rows after sliding again, the controller 403 clears data stored in the second data loader 402, controls the first data loader 401 to switch to the data outputting mode, and controls the second data loader 402 to switch to the data reading mode. The state of the data loading circuit 400 is same as that described above with reference to FIG. 5a.

It can be seen that, when the window slides within the K consecutive rows, the data loading circuit 400 is alternately in the following two states:
1) the first data loader 401 is in the data outputting mode and the second data loader 402 is in the data reading mode; and
2) the first data loader 401 is in the data reading mode and the second data loader 402 is in the data outputting mode.

Therefore, the data loading circuit 400 only reads a column of data in the K consecutive rows from the memory once, and does not repeatedly read the overlapping part of the matrix corresponding to the window at each window position.

According to an embodiment of the present disclosure, the controller is further configured to: if (e.g., in accordance with a determination by the controller that) the difference between the column address of the last column of the feature map and the column address of the last column of the matrix corresponding to the window is less than 2S, clear the data stored in the first data loader in the data outputting mode, and control the second data loader in the data reading mode to switch to an end-of-row outputting mode, wherein the second data loader in the end-of-row outputting mode outputs data stored therein to the calculation circuit.

According to some embodiments, if the window after the sliding has slid to the end of the K consecutive rows, the window stops the sliding within the K consecutive rows. In this case, the difference between the column address of the last column of the feature map and the column address of the last column of the matrix corresponding to the window after the sliding is less than S. Since the difference between the column address of the last column of the matrix corresponding to the window after the sliding and the column address of the last column of the matrix corresponding to the window before the sliding is S, when the difference between the column address of the last column of the feature map and the column address of the last column of the matrix corresponding to the window before the sliding is less than 2S, the window will reach the end of the K consecutive rows after the sliding.

According to some embodiments, when the window has slid to the end of the K consecutive rows, the controller 403 clears data stored in the data loader in the data outputting mode, and controls the data loader in the data reading mode to switch to the end-of-row outputting mode.

Figure 5C:
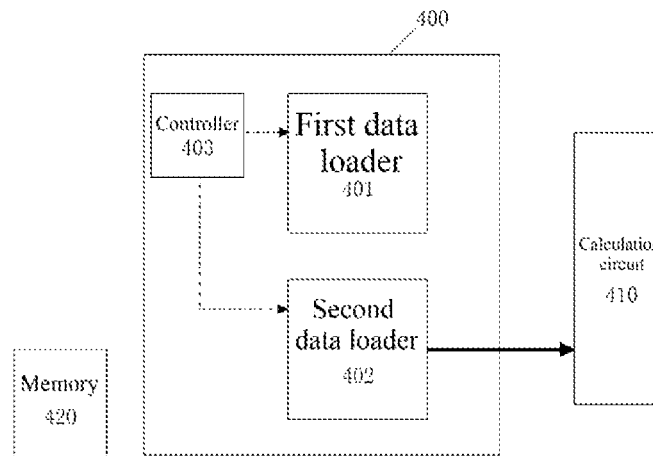

FIG. 5c shows the state of the data loading circuit 400 when the window has slid to the end of the K consecutive rows. As shown in FIG. 5c, the second data loader 402 is in the end-of-row outputting mode, and outputs data in the matrix corresponding to the window to the calculation circuit 410, while the first data loader 401 neither receives nor outputs data. It should be understood that, the second data loader 402 being in the end-of-row outputting mode shown here is only exemplary and it is also possible that the first data loader 401 is in the end-of-row outputting mode.

According to an embodiment of the present disclosure, the controller is further configured to: clear, after the second data loader in the end-of-row outputting mode completes the process of outputting the data stored therein to the calculation circuit, the data stored in the second data loader in the end-of-row outputting mode; and determine whether the difference between the row address of the last row of the feature map and the row address of the last row of the matrix corresponding to the window is greater than or equal to S, and if so, reselect K consecutive rows by reselecting the last (K−S) rows in the K consecutive rows and S rows after the K consecutive rows in the feature map, wherein the window starts to slide within the reselected K consecutive rows.

According to some embodiments, as shown in FIG. 2c, the window has slid to the end of the K consecutive rows, but has not slid to the end of the feature map. When the sliding of the window within the current K consecutive rows ends, a sliding within reselected K consecutive rows starts.

According to an embodiment of the present disclosure, the controller is further configured to: if (e.g., in accordance with a determination by the controller that) the difference between the column address of the last column of the feature map and the column address of the last column of the matrix corresponding to the window is less than 2S and the difference between the row address of the last row of the feature map and the row address of the last row of the matrix corresponding to the window is less than S, clear the data stored in the first data loader and the second data loader.

According to some embodiments, as shown in FIG. 2e, the window has slid to the end of the feature map, and then the sliding of the window in feature map ends.

Figure 5D:
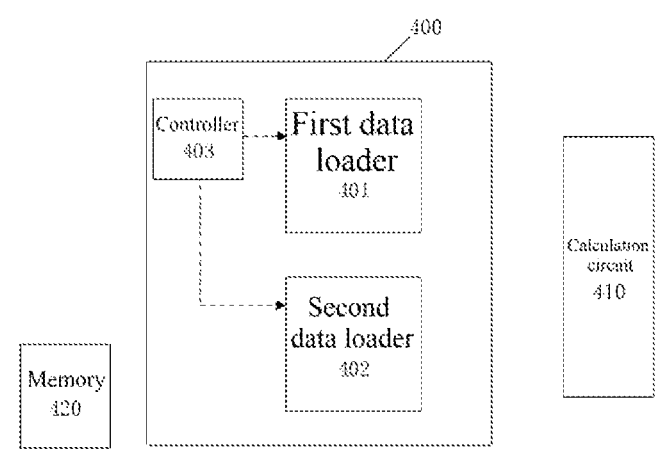

FIG. 5d shows the state of the data loading circuit 400 after the window has slid to the end of the feature map. As shown in FIG. 5d, both the first data loader 401 and the second data loader 402 no longer receive data or output data.

According to an embodiment of the present disclosure, the controller is further configured to: control, when the window starts to slide within the K consecutive rows, one of the two data loaders to be in a data pre-reading mode, wherein the data loader in the data pre-reading mode reads the data in the matrix corresponding to the window from the memory; and control the data loader in the data pre-reading mode to switch to the data outputting mode, and, after the data loader in the data pre-reading mode completes the process of reading the data from the memory, control the other data loader to switch to the data reading mode.

According to some embodiments, as shown in FIG. 2a, when the window starts to slide in the feature map, the window starts to slide within the $0^{th}$ row to the $(K-1)^{th}$ row of the feature map. According to some other embodiments, as shown in FIG. 2c, when the sliding of the window within the current K consecutive rows ends, the window starts to slide within the reselected K consecutive rows. In these two cases, when the window starts to slide within the K consecutive rows, the data registers 401 and 402 have not stored any data in the K consecutive rows, so the data loading circuit 400 needs to read all data in the matrix corresponding to the current window (namely, the $0^{th}$ column to the $(K-1)^{th}$ column in the K consecutive rows) at first.

Figure 5E:
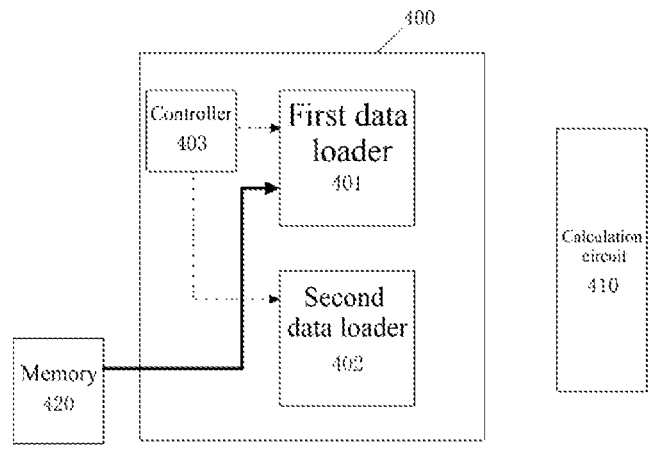

FIG. 5e shows the state of the data loading circuit 400 when the window starts to slide within the K consecutive rows. As shown in FIG. 5e, the first data loader 401 in the data pre-reading mode reads data from the memory 420. When it is determined that the first data loader 401 has completed the process of reading the data from the memory 420, the controller 403 controls the first data loader 401 to switch to the data outputting mode, and controls the second data loader 402 to switch to the data reading mode. The state of the data loading circuit 400 changes into the state described with reference to FIG. 5a or 5b. It should be understood that, in FIG. 5e, selecting the first data loader 401 to be in the data pre-reading mode is only exemplary and it is also possible to select the second data loader 402 to be in the data pre-reading mode.

FIGS. 6a to 6d are schematic diagrams showing the state of the data loading circuit 400 when the convolution kernel of the neural network slides in the feature map in accordance with some embodiments, such as an exemplary embodiment of the present disclosure. In FIGS. 6a to 6d, the bold solid line indicates that the data loaders 401 and 402 receive or output data through a data path corresponding to the line. It should be understood that, for ease of description, the data path that does not convey data at the current moment is not shown in FIGS. 6a to 6d.

According to an embodiment of the present disclosure, if (e.g., in accordance with a determination by the controller that) the difference between the column address of the last column of the feature map and the column address of the last column of the matrix corresponding to the window is less than 2S, it is determined whether the difference between the row address of the last row of the feature map and the row address of the last row of the matrix corresponding to the window is greater than or equal to S, and if so, the data stored in the first data loader in the data outputting mode is cleared, the first data loader in the data outputting mode is controlled to switch to the data pre-reading mode, and the second data loader in the data reading mode is controlled to switch to the end-of-row outputting mode, wherein the first data loader in the data pre-reading mode reads, from the memory, the first K columns in the last (K−S) rows in the K consecutive rows and S rows after the K consecutive rows in the feature map, and the second data loader in the end-of-row outputting mode outputs data stored therein to the calculation circuit.

According to some embodiments, when the window has slid to the end of the K consecutive rows, if the window has not slid to the end of the feature map, the window will continue to slide within the reselected K rows of the feature map. In this case, the difference between the row address of the last row of the feature map and the row address of the last row of the matrix corresponding to the window after the sliding is greater than or equal to S. Since the row address of the last row of the matrix corresponding to the window after the sliding is the same as the row address of the last row of the matrix corresponding to the window before the sliding, when the difference between the row address of the last row of the feature map and the row address of the last row of the matrix corresponding to the window before the sliding is greater than or equal to S, the window will continue to slide within the reselected K rows of the feature map after completing this sliding. Since the window slides at a step of S in the feature map, the reselected K rows are the last (K−S) rows in the K consecutive rows and S rows after the K consecutive rows of the feature map.

According to some embodiments, when the window has slid to the end of the K consecutive rows, if the window has not slid to the end of the feature map, the controller 403 clears data stored in the data loader in the data outputting mode, controls the data loader in the data outputting mode to switch to the data pre-reading mode, and controls the data loader in the data reading mode to switch to the end-of-row outputting mode. The data loader in the end-of-row outputting mode outputs the data stored therein, and the data loader in the data pre-reading mode reads data in the first K columns in the reselected K rows, namely, data in the matrix corresponding to the window when the window starts to slide within the reselected K rows.

Figure 6A:
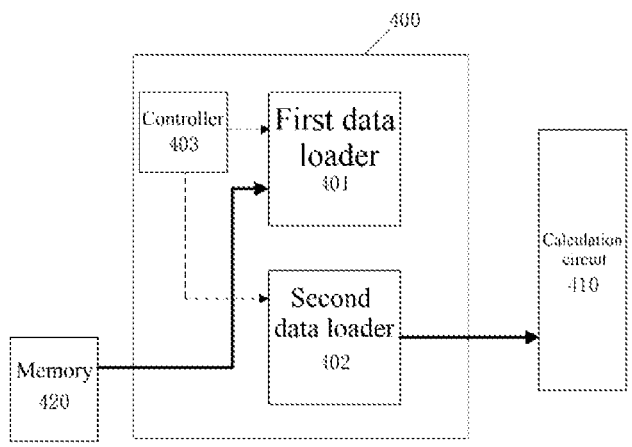
FIGS. 6a to 6d are schematic diagrams showing the state of a data loading circuit when the convolution kernel of a neural network slides in a feature map in accordance with some embodiments, such as an exemplary embodiment of the present disclosure.

FIG. 6a shows the state of the data loading circuit 400 when the window has slid to the end of the K consecutive rows but has not slid to the end of the feature map. As shown in FIG. 6a, the second data loader 402 in the end-of-row outputting mode outputs data in the matrix corresponding to the window to the calculation circuit 410, while the first data loader 401 in the data pre-reading mode reads the data in the first K columns in the reselected K rows from the memory 420. It should be understood that, the case that the first data loader 401 is in the data pre-reading mode and the second data loader 402 is in the end-of-row outputting mode shown in FIG. 6a is only exemplary and it is also possible that the first data loader 401 is in the end-of-row outputting mode and the second data loader 402 is in the data pre-reading mode.

Since the data loading circuit reads the data in the first K columns in the reselected K rows while outputting data in the matrix corresponding to the window when the window has slid to the end of the current K rows, the data reading delay caused by reading the data in the first K columns in the reselected K rows from the memory is further reduced.

According to an embodiment of the present disclosure, the controller is further configured to: clear, after the first data loader in the data pre-reading mode completes the process of reading the data from the memory and the second data loader in the end-of-row outputting mode completes the process of outputting the data stored therein to the calculation circuit, the data stored in the second data loader in the end-of-row outputting mode; reselect K consecutive rows by reselecting the last (K−S) rows in the K consecutive rows and S rows after the K consecutive rows in the feature map, wherein the window starts to slide within the reselected K consecutive rows; and control the first data loader in the data pre-reading mode to switch to the data outputting mode, and control the second data loader in the end-of-row outputting mode to switch to the data reading mode.

According to some embodiments, if the data loader in the data pre-reading mode has completed the process of reading the data from the memory 420 and the data loader in the end-of-row outputting mode has completed the process of outputting the data to the calculation circuit 410, the data loading circuit 400 has completed all data output operations corresponding to the window sliding within the current K rows, and has read the data in the matrix corresponding to the window when the window starts to slide within the reselected K rows. In this case, the window may start to slide within the reselected K rows, the controller 403 controls the data loader in the data pre-reading mode to switch to the data outputting mode, and controls the data loader in the end-of-row outputting mode to switch to the data reading mode. The state of the data loading circuit 400 is as shown in FIG. 5a or 5b.

According to an embodiment of the present disclosure, the controller is further configured to: if (e.g., in accordance with a determination by the controller that) the difference between the row address of the last row of the feature map and the row address of the last row of the matrix corresponding to the window is less than S, control the second data loader to switch from the data reading mode to the end-of-row outputting mode; and after the second data loader in the end-of-row outputting mode completes the process of outputting the data stored therein to the calculation circuit, clear the data stored in the first data loader and the second data loader. According to some embodiments, when the window has slid to the end of the K consecutive rows, if the window has slid to the end of the feature map, the sliding of the window in feature map ends. In this case, the difference between the row address of the last row of the feature map and the row address of the last row of the matrix corresponding to the window before the sliding is less than S.

According to some embodiments, when the window has slid to the end of the K consecutive rows, if (e.g., in accordance with a determination by the controller that) the window has slid to the end of the feature map, the controller 403 clears data stored in the data loader in the data outputting mode, and controls the data loader in the data reading mode to switch to the end-of-row outputting mode. The data loader in the end-of-row outputting mode outputs the data stored therein.

Figure 6B:
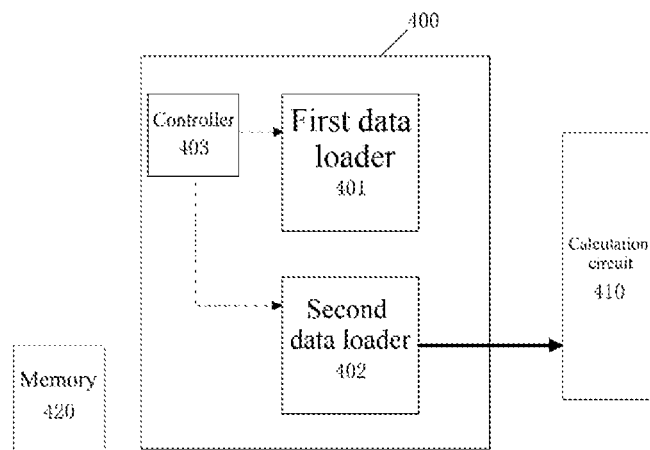

FIG. 6b shows the state of the data loading circuit 400 when the window has slid to the end of the feature map. As shown in FIG. 6b, the second data loader 402 is in the end-of-row outputting mode outputs data in the matrix corresponding to the window to the calculation circuit 410, while the first data loader 401 neither outputs nor reads data. It should be understood that, the case that the second data loader 402 is in the end-of-row outputting mode shown in FIG. 6b is only exemplary and it is also possible that the first data loader 401 is in the end-of-row outputting mode.

According to some embodiments, when the window has slid to the end of the feature map, if the data loader in the end-of-row outputting mode has completed the process of outputting the data to the calculation circuit, the sliding of the window in the feature map ends.

According to some embodiments, after the window has slid to the end of the feature map, the controller 403 clears the data stored in the first data loader 401 and the second data loader 402.

Figure 6C:
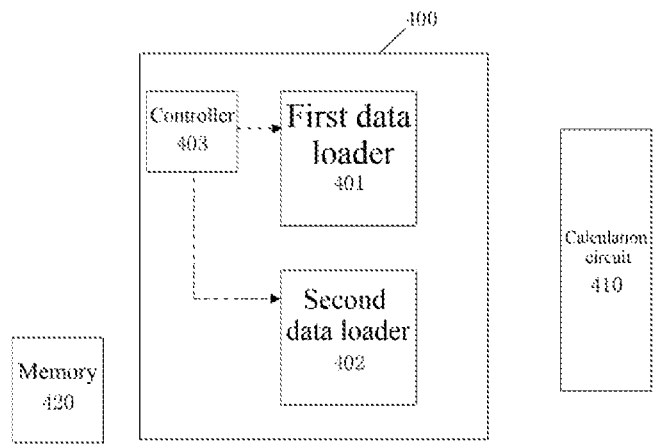

FIG. 6c shows the state of the data loading circuit 400 after the window has slid to the end of the feature map. As shown in FIG. 6c, the same as that described with reference to FIG. 5d, both the first data loader 401 and the second data loader 402 no longer receive data or output data.

According to the embodiment of the present disclosure, the first K rows of the feature map are selected when the window starts to slide in the feature map, the window then starts to slide within the selected K consecutive rows; one of the two data loaders is controlled to be in the data pre-reading mode, wherein the data loader in the data pre-reading mode reads the data in the matrix corresponding to the window from the memory; and after the data loader in the data pre-reading mode completes the process of reading the data from the memory, the data loader in the data pre-reading mode is controlled to switch to the data outputting mode, and the other data loader is controlled to switch to the data reading mode.

According to some embodiments, as shown in FIG. 2a, when the window starts to slide in the feature map, the window starts to slide within the $0^{th}$ row to the $(K-1)^{th}$ row of the feature map. When the window starts to slide in the feature map, the data loaders 401 and 402 have not stored any data in the K consecutive rows, so the data loading circuit 400 needs to read all data in the matrix corresponding to the current window at first (namely, the $0^{th}$ column to the $(K-1)^{th}$ column in the $0^{th}$ row to the $(K-1)^{th}$ row of the feature map).

Figure 6D:
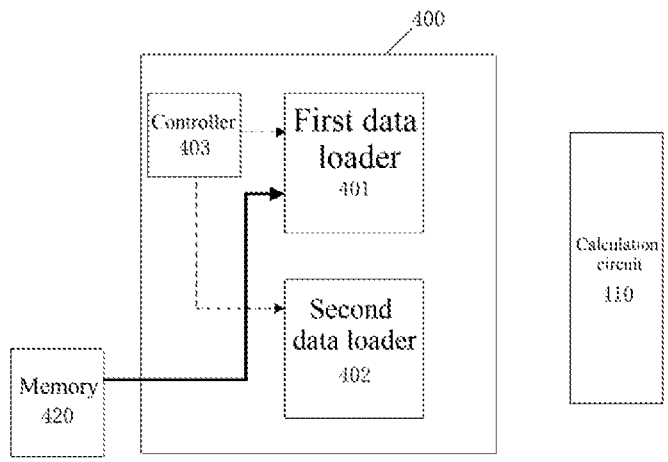

FIG. 6d shows the state of the data loading circuit 400 when the window starts to slide within the K consecutive rows. The same as that described with reference to FIG. 5e, the first data loader 401 in the data pre-reading mode reads data from the memory 420. When it is determined that the first data loader 401 has completed the process of reading the data from the memory 420, the controller 403 controls the first data loader 401 to switch to the data outputting mode, and controls the second data loader 402 to switch to the data reading mode. The state of the data loading circuit 400 changes into the state described with reference to FIG. 5a or 5b. It should be understood that, in FIG. 6d, selecting the first data loader 401 to be in the data pre-reading mode is only exemplary and it is also possible to select the second data loader 402 to be in the data pre-reading mode.

According to the embodiment of the present disclosure, the feature map has M channels, where M is a positive integer, and each of the two data loaders comprises a register. The register is configured to sequentially store, based on column addresses, data in columns of the matrix corresponding to the window, wherein an output end of the register is coupled to an input end of a corresponding shifter, the shifter being configured to shift received data forward by (S*M*K) bits.

Figure 7:
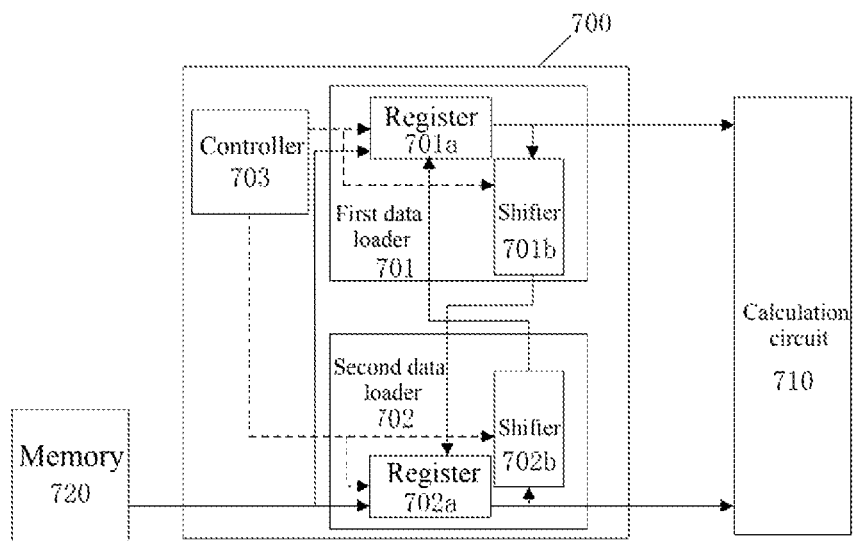
FIG. 7 shows a structural block diagram of a data loading circuit in accordance with some embodiments, such as an exemplary embodiment of the present disclosure.

FIG. 7 shows a structural block diagram of a data loading circuit 700 in accordance with some embodiments, such as an exemplary embodiment of the present disclosure. The data loading circuit 700 comprises a first data loader 701, a second data loader 702, and a controller 703. When a window slides in a feature map, operations of the first data loader 701, the second data loader 702, and the controller 703 are the same as operations of the first data loader 401, the second data loader 402, and the controller 403 described with reference to FIGS. 4 and 5a to 5e, or operations of the first data loader 401, the second data loader 402, and the controller 403 described with reference to FIGS. 4, 5a to 5b, and 6a to 6d.

According to the embodiment of the present disclosure, the first data loader 701 comprises a register 701a, and the second data loader 702 comprises a register 702a. The output end of the register 701a is coupled to the input end of the shifter 701b, and the output end of the register 702a is coupled to the input end of the shifter 702b.

According to the embodiment of the present disclosure, each of the two data loaders 701 and 702 is configured such that when the data loader is in the data outputting mode, the register in the data loader is configured to simultaneously output the data in the matrix corresponding to the window to a calculation circuit 710 and the shifter corresponding to the register, and the shifter corresponding to the register is configured to shift the received data, and output, to a register in the other data loader, the shifted data; and when the data loader is in the data reading mode, the register in the data loader is configured to receive data from the shifter corresponding to the register in the other data loader, and read the data from a memory 720.

For example, when the first data loader 701 is in the data outputting mode and the second data loader 702 is in the data reading mode, the register 701a in the first data loader 701 simultaneously outputs the data in the matrix corresponding to the window to the calculation circuit 710 and the shifter 701b, and the shifter 701b shifts the received data, and outputs, to the register 702a in the second data loader, the shifted data; and the register 702a receives the data from the shifter 701b, and reads the data from the memory 720.

According to some embodiments, as shown in FIG. 7, the shifter 701b is included in the first data loader 701 where the register 701a coupled to said shifter is located, and the shifter 702b is included in the second data loader 702 where the register 702a coupled to said shifter is located. According to some other embodiments, the shifter 701b is included in the second data loader 702 where the register 702a which receives the output from said shifter is located, and the shifter 702b is included in the first data loader 701 where the register 701a which receives the output from said shifter is located. According to some other embodiments, the shifters 701b and 702b may not be included in the first data loader 701 and the second data loader 702.

Figure 8:
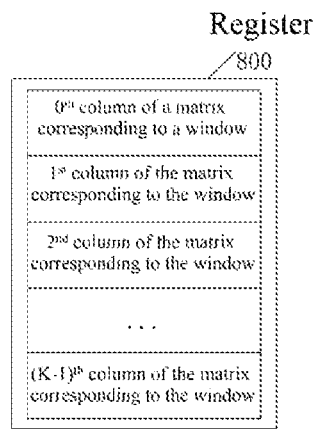
FIG. 8 is a schematic diagram showing a register in accordance with some embodiments, such as an exemplary embodiment of the present disclosure.

FIG. 8 is a schematic diagram showing a register 800 in accordance with some embodiments, such as an exemplary embodiment of the present disclosure. As shown in FIG. 8, the register 800 sequentially stores, based on column addresses, the $0^{th}$ column, the $1^{st}$ column, $2^{nd}$ column, . . . , and the $(K-1)^{th}$ column of the matrix corresponding to the window. Each column of the matrix corresponding to the window is a column in the K consecutive rows where the window is sliding, so data in each column of the matrix corresponding to the matrix is (M*K) bits.

Figure 9:
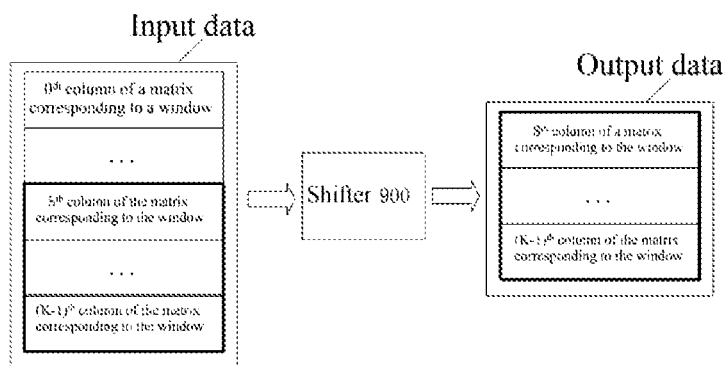
FIG. 9 is a schematic diagram showing a shifter in accordance with some embodiments, such as an exemplary embodiment of the present disclosure.

FIG. 9 is a schematic diagram showing a shifter 900 in accordance with some embodiments, such as an exemplary embodiment of the present disclosure.

According to the embodiment of the present disclosure, as described with reference to FIG. 7, when a data loader is in a data outputting mode, the shifter 900 receives data in a matrix corresponding to a window from a register coupled to the shifter. Since the register sequentially stores, based on row addresses, columns of the matrix corresponding to the window, among the data received by the shifter, the data in the $0^{th}$ position to the data in the $(M*K-1)^{th}$ position are data in the $0^{th}$ column of the matrix corresponding to the window, the data in the $(M*K)^{th}$ position to the data in the $(2M*K-1)^{th}$ position are data in the $1^{st}$ column of the matrix corresponding to the window, the data in the $(2M*K)^{th}$ position to the data in the $(3M*K-1)^{th}$ position are data in the $2^{nd}$ column of the matrix corresponding to the window, . . . , and the data in the $(K-1)*M*K)^{th}$ position to the data in the $(K*M*K-1)^{th}$ position are data in the $(K-1)^{th}$ column of the matrix corresponding to the window.

According to the embodiment of the present disclosure, the shifter 900 shifts the received data forward by (S*M*K) bits, that is, the data in the $i^{th}$ position of the received data is shifted to be the data in the $(i-S*M*K)^{th}$ (where i is a positive integer and i≥S*M*K) position of the data output by the shifter 900. Therefore, when receiving the data in the matrix corresponding to the window, the shifter 900 outputs the data in the $(S*M*K)^{th}$ position to the data in the $(K*M*K-1)^{th}$ position of the received data. As analyzed above, the data in the $(S*M*K)^{th}$ position to the data in the $(K*M*K-1)^{th}$ position of the data in the matrix corresponding to the window are data in the $S^{th}$ column to the $(K-1)^{th}$ column (namely, the last (K-S) column of the matrix corresponding to the window) of the matrix corresponding to the window.

Therefore, as shown in FIG. 9, when the shifter 900 receives the data in the matrix corresponding to the window from the register, the shifter outputs data in the last (K-S) columns of the matrix corresponding to the window.

According to the embodiment of the present disclosure, the shifter is a combinational logic circuit. When the shifter is the combinational logic circuit, the shifter may shift the received data all at once, which reduces the delay of the shifting operation.

According to some embodiments, the shifter is a barrel shifter or a logarithmic shifter.

FIGS. 10a to 10g are schematic diagrams showing example operations of a data loading circuit 1000 when the convolution kernel of a neural network slides in a feature map in accordance with some embodiments, such as an exemplary embodiment of the present disclosure. Various components in FIGS. 10a to 10g may correspond to various components in FIGS. 7 to 9. In the example of FIGS. 10a to 10g, the size of the feature map is 5×5 data, the size of the convolution kernel is 3×3 data, the number of channels of each of the feature map and the convolution kernel is 3, and the step of window sliding is 1.

Figure 10A:
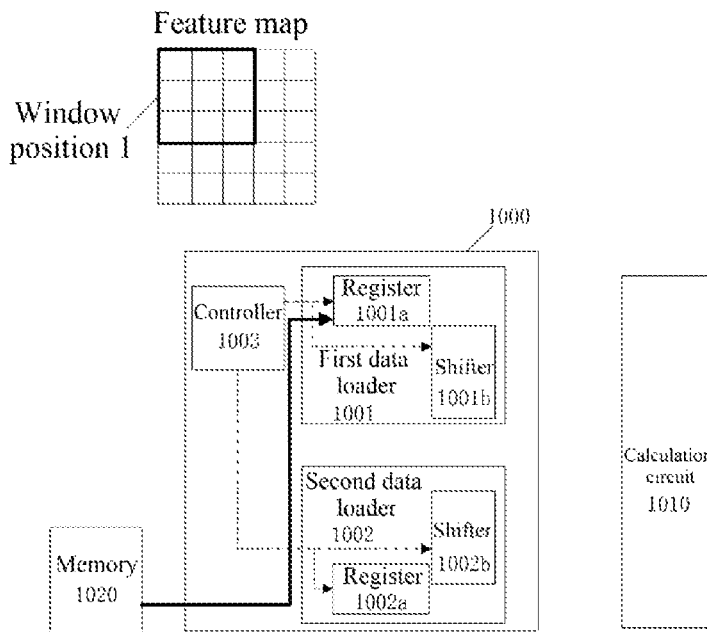
FIGS. 10a to 10g are schematic diagrams showing example operations of a data loading circuit when the convolution kernel of a neural network slides in a feature map in accordance with some embodiments, such as an exemplary embodiment of the present disclosure.

As shown in FIG. 10a, when a window starts to slide within the $0^{th}$ row to the $2^{nd}$ row of the feature map, the window is at a window position 1, and the window position 1 corresponds to the $0^{th}$ column to the $2^{nd}$ column in the $0^{th}$ row to the $2^{nd}$ row of the feature map. In this case, a controller 1003 controls a first data loader 1001 to be in the data pre-reading mode, and a register 1001a in the first data loader 1001 reads data in the matrix corresponding to the window at the window position 1 from a memory 1020. It should be understood that, controlling the first data loader 1001 to be in the data pre-reading mode here is only exemplary and alternatively, a second data loader 1002 may be selected to be in the data pre-reading mode.

After it is determined that the first data loader 1001 has completed the process of reading the data from the memory 1020, the controller 1003 controls the first data loader 1001 to switch to the data outputting mode, and controls the second data loader 1002 to switch to the data reading mode. The state of the data loading circuit 1000 is shown in FIG. 10b.

Figure 10B:
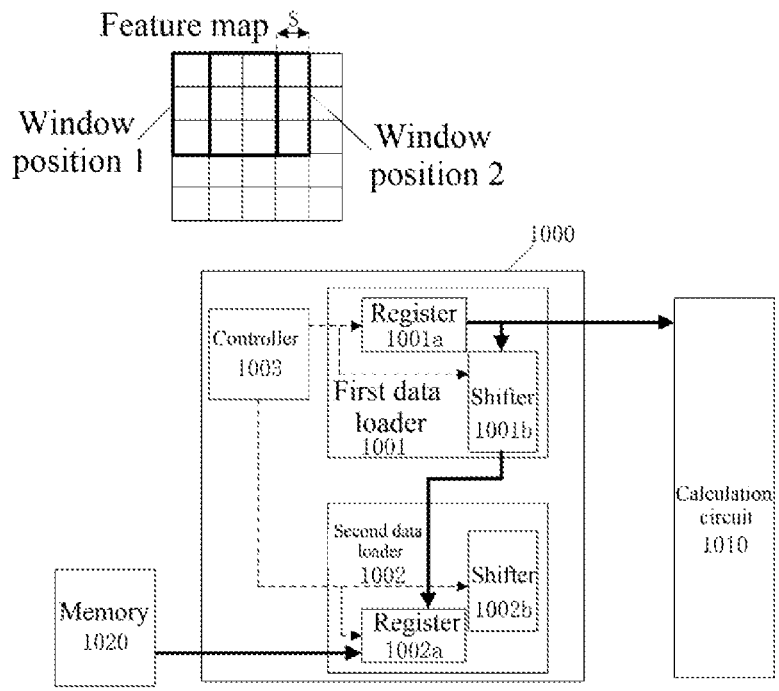

As shown in FIG. 10b, when the window slides for the first time within the $0^{th}$ row to the $2^{nd}$ row of the feature map, the window slides from the window position 1 to a window position 2, and the window position 2 corresponds to the $1^{st}$ column to the $3^{rd}$ column in the $0^{th}$ row to the $2^{nd}$ row of the feature map. In this case, the register 1001a in the first data loader 1001 simultaneously outputs the data in the matrix corresponding to the window at the window position 1 to a calculation circuit 1010 and a shifter 1001b in the first data loader, and the shifter 1001b shifts the received data, and outputs, to a register 1002a in the second data loader 1002, the shifted data; and the register 1002a in the second data loader 1002 receives the data from the shifter 1001b, and reads the data from the memory 1020. The shifter 1001b shifts the received data forward by (3*3*1) bits, namely, 9 bits, so as to output data in the first two columns of a matrix corresponding to the window at the window position 2 to the register 1002a in the second data loader 1002, and the register 1002a in the second data loader 1002 reads data in the last column of the matrix corresponding to the window at the window position 2 from the memory 1020.

After it is determined that the second data loader 1002 has completed the process of receiving the data from the first data loader 1001 and reading the data from the memory 1020, it is determined that the difference between the column address of the last column of the feature map and the column address of the last column of the matrix corresponding to the window at the window position 1 is 2, which is equal to 2 (in this example, the step is 1), thus the window will continue to slide along the 0th row to the $2^{nd}$ row of the feature map after having slid to the window position 2. The controller 1003 clears the data stored in the register 1001a in the first data loader 1001, controls the first data loader 1001 to switch to the data reading mode, and controls the second data loader 1002 to switch to the data outputting mode. The state of the data loading circuit 1000 is shown in FIG. 10c.

Figure 10C:
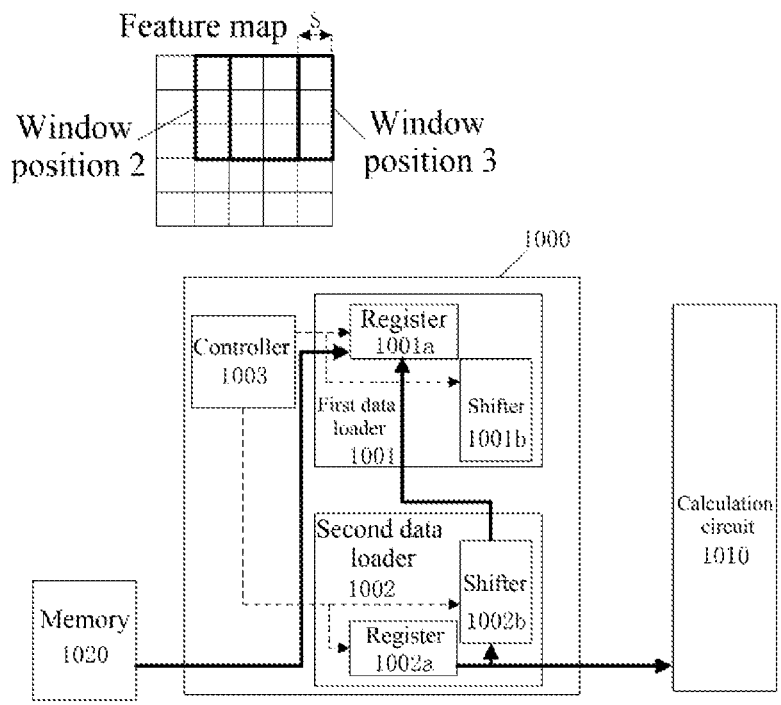

As shown in FIG. 10c, when the window slides again within the $0^{th}$ row to the $2^{nd}$ row of the feature map, the window slides from the window position 2 to a window position 3, and the window position 3 corresponds to the $2^{nd}$ column to the $4^{th}$ column in the 0th row to the $2^{nd}$ row of the feature map. In this case, the register 1002a in the second data loader 1002 simultaneously outputs data in the matrix corresponding to the window at the window position 2 to the calculation circuit 1010 and a shifter 1002b, and the shifter 1002b shifts the received data, and outputs, to the register 1001a in the first data loader 1001, the shifted data; and the register 1001a in the first data loader 1001 receives the data from the shifter 1002b, and reads the data from the memory 1020. The shifter 1002b shifts the received data forward by (3*3*1) bits, namely, 9 bits, so as to output data in the first two columns of a matrix corresponding to the window at the window position 3 to the register 1001a in the first data loader 1001, and the register 1001a in the first data loader 1001 reads data in the last column of the matrix corresponding to the window at the window position 3 from the memory 1020.

After it is determined that the first data loader 1001 has completed the process of receiving the data from the second data loader 1002 and reading the data from the memory 1020, it is determined that the difference between the column address of the last column of the feature map and the column address of the last column of the matrix corresponding to the window at the window position 2 is 1, which is less than 2 (in this example, the step is 1), thus the window has slid to the end of the $0^{th}$ row to the $2^{nd}$ row of the feature map after having slid to the window position 3. The controller 1003 clears the data stored in the register 1002a in the second data loader 1002, and controls the first data loader 1001 to output data stored therein to the calculation circuit 1010. The state of the data loading circuit 1000 is shown in FIG. 10d.

Figure 10D:
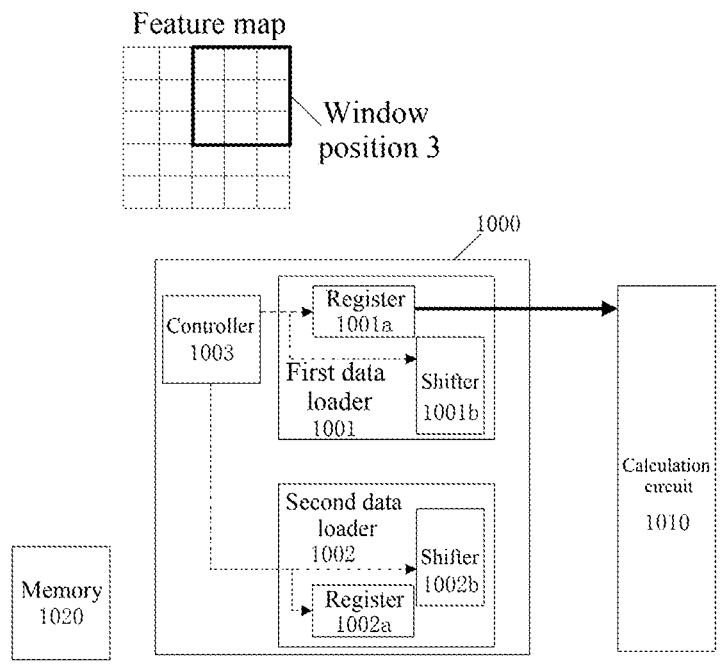

As shown in FIG. 10d, the register 1001a in the first data loader 1001 outputs data in the matrix corresponding to the window at the window position 3 to the calculation circuit 1010, while the second data loader 1002 neither reads nor outputs data.

After it is determined that the first data loader 1001 outputs the data stored therein to the calculation circuit 1010, the controller 1003 clears the data stored in the register 1001a in the first data loader 1001, and reselects the $1^{st}$ row to the $3^{rd}$ row of the feature map, the window then starting to slide within the $1^{st}$ row to the $3^{rd}$ row of the feature map. Similar to that described with reference to FIG. 10a, the controller 1003 controls the first data loader 1001 to be in the data pre-reading mode, and the state of the data loading circuit 1000 is shown in FIG. 10e.

Figure 10E:
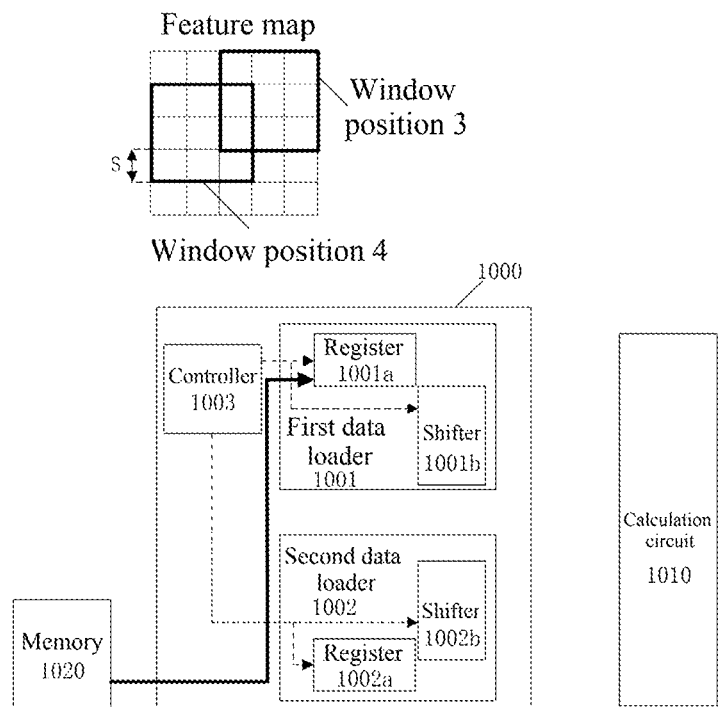

As shown in FIG. 10e, when the window starts to slide within the $1^{st}$ row to the $3^{rd}$ row of the feature map, the window is at a window position 4, and the window position 4 corresponds to the $0^{st}$ column to the $2^{nd}$ column in the $1^{th}$ row to the $3^{nd}$ row of the feature map. In this case, the register 1001a in the first data loader 1001 reads data in a matrix corresponding to the window at the window position 4 from the memory 1020. It should be understood that, controlling the first data loader 1001 to be in the data pre-reading mode here is only exemplary and alternatively, the second data loader 1002 may be selected to be in the data pre-reading mode.

After it is determined that the first data loader 1001 has completed the process of reading the data from the memory 1020, the controller 1003 controls the first data loader 1001 to switch to the data outputting mode, and controls the second data loader 1002 to switch to the data reading mode. The state of the data loading circuit 1000 is shown in FIG. 10f.

Figure 10F:
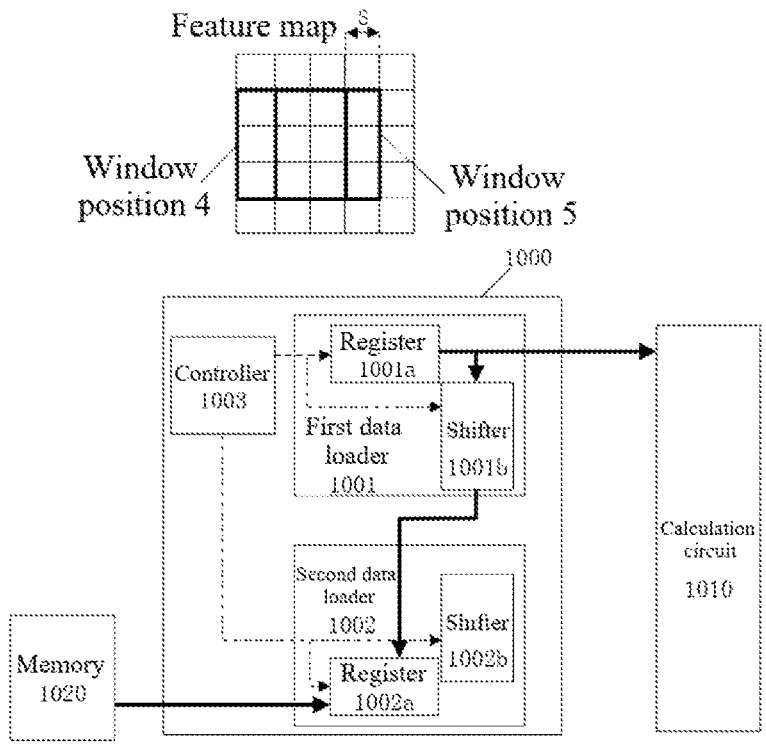

As shown in FIG. 10f, the same as that described with reference to FIG. 10b, the window slides from the window position 4 to a window position 5, the register 1001a in the first data loader 1001 simultaneously outputs the data in the matrix corresponding to the window at the window position 4 to the calculation circuit 1010 and the shifter 1001b in the first data loader, and the shifter 1001b shifts the received data, and outputs, to the register 1002a in the second data loader 1002, the shifted data; and the register 1002a in the second data loader 1002 receives data in the first two columns of the matrix corresponding to the window at the window position 5 from the shifter 1001b, and the register 1002a in the second data loader 1002 reads data in the last column of the matrix corresponding to the window at the window position 5 from the memory 1020.

Figure 10G:
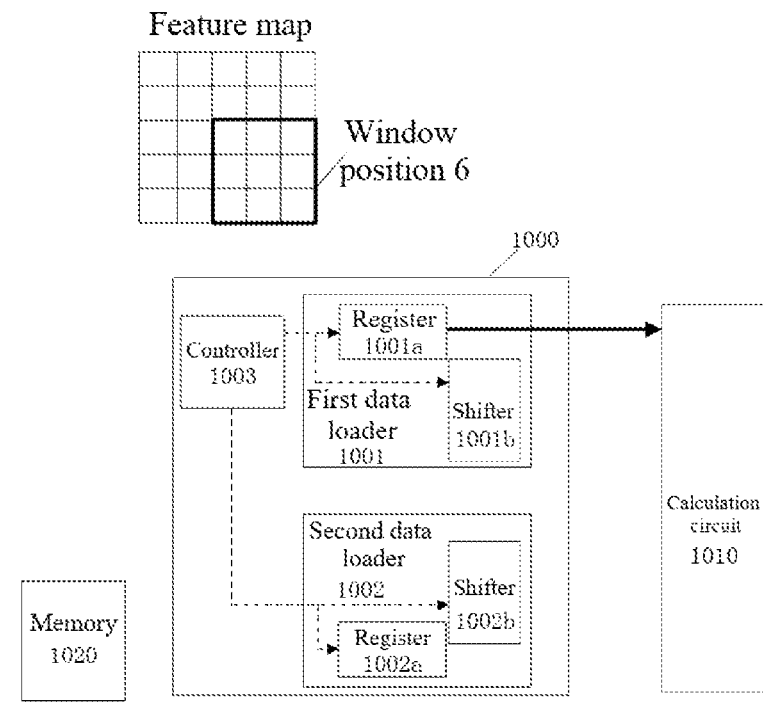

As shown in FIG. 10g, when the window has slid to a window position 6, the window has slid to the end of the feature map. In this case, the register 1001a in the first data loader 1001 outputs data in a matrix corresponding to the window at the window position 6 to the calculation circuit 1010, while the second data loader 1002 neither reads nor outputs data.

FIGS. 11a to 11f are schematic diagrams showing an example operation of a data loading circuit 1000 when the convolution kernel of a neural network slides in a feature map in accordance with some embodiments, such as an exemplary embodiment of the present disclosure. Various components in FIGS. 11a to 11f may correspond to various components in FIGS. 7 to 9. In the example of FIGS. 11a to 11f, the size of the feature map is 5×5 data, the size of the convolution kernel is 3×3 data, the number of channels of each of the feature map and the convolution kernel is 3, and the step of window sliding is 1.

Figure 11A:
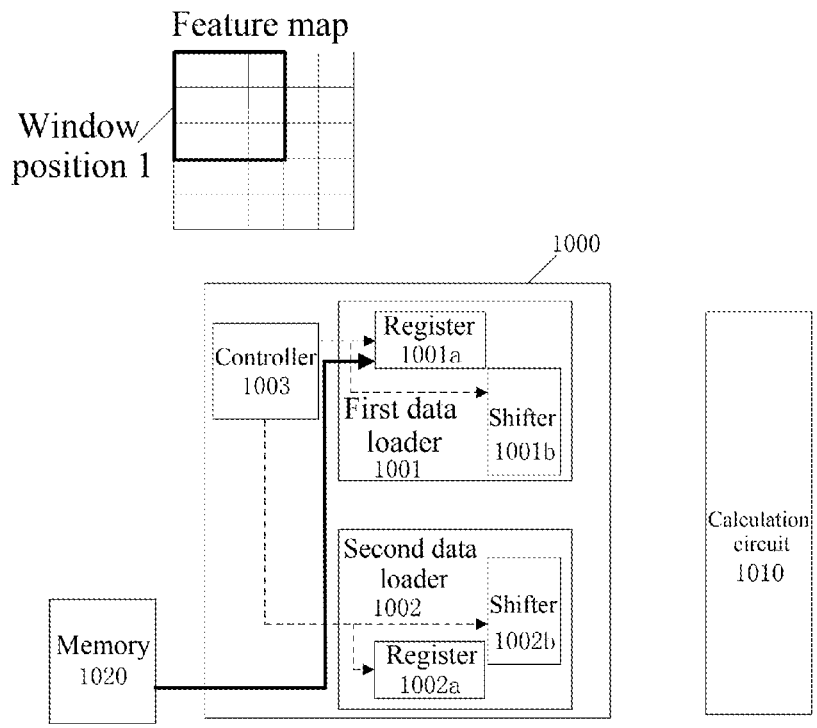
FIGS. 11a to 11f are schematic diagrams showing example operations of a data loading circuit when the convolution kernel of a neural network slides in a feature map in accordance with some embodiments, such as an exemplary embodiment of the present disclosure.

As shown in FIG. 11a, when a window starts to slide in the feature map, the window is at a window position 1, and the window position 1 corresponds to the $0^{th}$ column to the $2^{nd}$ column in the $0^{th}$ row to the $2^{nd}$ row of the feature map. In this case, a controller 1003 controls a first data loader 1001 to be in a data pre-reading mode, and a register 1001a in the first data loader 1001 reads data in the matrix corresponding to the window at the window position 1 from a memory 1020. It should be understood that, controlling the first data loader 1001 to be in the data pre-reading mode here is only exemplary and alternatively, a second data loader 1002 may be selected to be in the data pre-reading mode.

After it is determined that the first data loader 1001 has completed the process of reading the data from the memory 1020, the controller 1003 controls the first data loader 1001 to switch to the data outputting mode, and controls the second data loader 1002 to switch to the data reading mode. The state of the data loading circuit 1000 is shown in FIG. 11b.

Figure 11B:
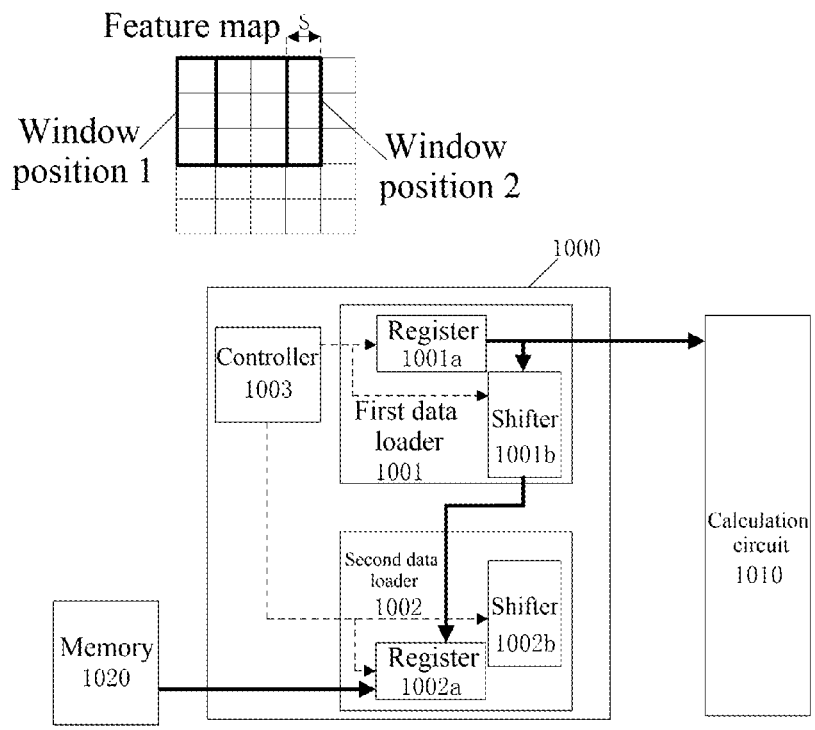

As shown in FIG. 11b, when the window slides for the first time within the 0th row to the $2^{nd}$ row of the feature map, the window slides from the window position 1 to a window position 2, and the window position 2 corresponds to the $1^{st}$ column to the $3^{rd}$ column in the $0^{th}$ row to the $2^{nd}$ row of the feature map. In this case, the register 1001a in the first data loader 1001 simultaneously outputs the data in the matrix corresponding to the window at the window position 1 to a calculation circuit 1010 and a shifter 1001b in the first data loader, and the shifter 1001b shifts the received data, and outputs, to a register 1002a in the second data loader 1002, the shifted data; and the register 1002a in the second data loader 1002 receives the data from the shifter 1001b, and reads the data from the memory 1020. The shifter 1001b shifts the received data forward by (3*3*1) bits, namely, 9 bits, so as to output data in the first two columns of a matrix corresponding to the window at the window position 2 to the register 1002a in the second data loader 1002, and the register 1002a in the second data loader 1002 reads data in the last column of the matrix corresponding to the window at the window position 2 from the memory 1020.

After it is determined that the second data loader 1002 has completed the process of receiving the data from the first data loader 1001 and reading the data from the memory 1020, it is determined that the difference between the column address of the last column of the feature map and the column address of the last column of the matrix corresponding to the window at the window position 1 is 2, which is equal to 2 (in this example, the step is 1), thus the window will continue to slide along the $0^{th}$ row to the $2^{nd}$ row of the feature map after having slid to the window position 2. The controller 1003 clears the data stored in the register 1001a in the first data loader 1001, controls the first data loader 1001 to switch to the data reading mode, and controls the second data loader 1002 to switch to the data outputting mode. The state of the data loading circuit 1000 is shown in FIG. 11c.

Figure 11C:
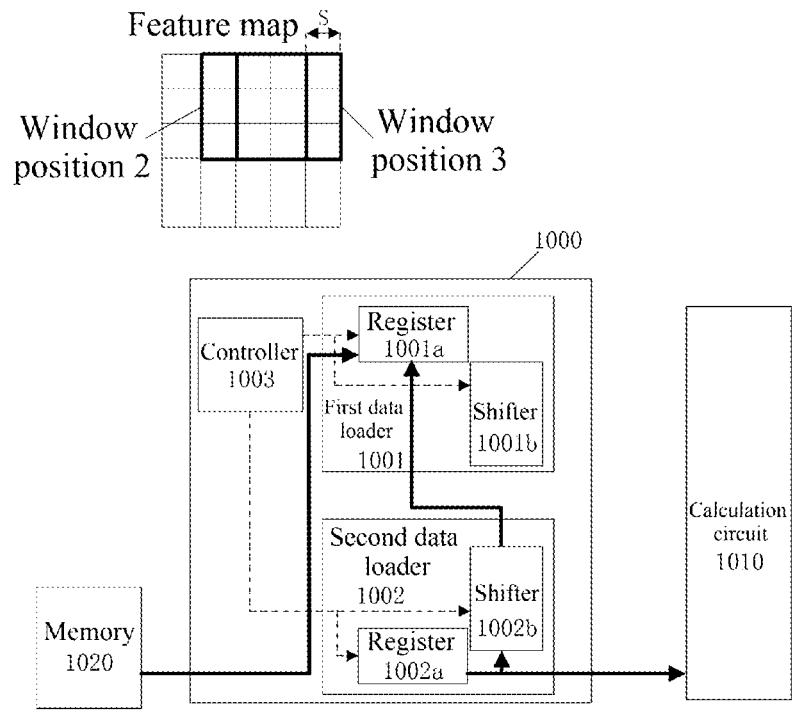

As shown in FIG. 11c, when the window slides again within the $0^{th}$ row to the $2^{nd}$ row of the feature map, the window slides from the window position 2 to a window position 3, and the window position 3 corresponds to the $2^{nd}$ column to the $4^{th}$ column in the $0^{th}$ row to the $2^{nd}$ row of the feature map. In this case, the register 1002a in the second data loader 1002 simultaneously outputs data in the matrix corresponding to the window at the window position 2 to the calculation circuit 1010 and the shifter 1002b, and the shifter 1002b shifts the received data, and outputs, to the register 1001a in the first data loader 1001, the shifted data; and the register 1001a in the first data loader 1001 receives the data from the shifter 1002b, and reads the data from the memory 1020. The shifter 1002b shifts the received data forward by (3*3*1) bits, namely, 9 bits, so as to output data in the first two columns of the matrix corresponding to the window at the window position 3 to the register 1001a in the first data loader 1001, and the register 1001a in the first data loader 1001 reads data in the last column of the matrix corresponding to the window at the window position 3 from the memory 1020.

After it is determined that the first data loader 1001 has completed the process of receiving the data from the second data loader 1002 and reading the data from the memory 1020, it is determined that the difference between the column address of the last column of the feature map and the column address of the last column of the matrix corresponding to the window at the window position 2 is 1, which is less than 2 (in this example, the step is 1), thus the window has slid to the end of the $0^{th}$ row to the $2^{nd}$ row of the feature map after having slid to the window position 3; and it is determined that the difference between the row address of the last row of the feature map and the row address of the last row of the matrix corresponding to the window at the window position 2 is 2, which is equal to 2, thus the window will continue to slide within the $1^{st}$ row to the $3^{rd}$ row of the feature map. The controller 1003 clears the data stored in the register 1002a in the second data loader 1002, and controls the first data loader 1001 to output data stored therein to the calculation circuit 1010, and controls the second data loader 1002 to read data in the $0^{th}$ column to the $2^{nd}$ column in the $1^{st}$ row to $3^{rd}$ row (namely, a matrix corresponding to the window at a window position 4) of the feature map from the memory 1020. The state of the data loading circuit 1000 is shown in FIG. 11d.

Figure 11D:
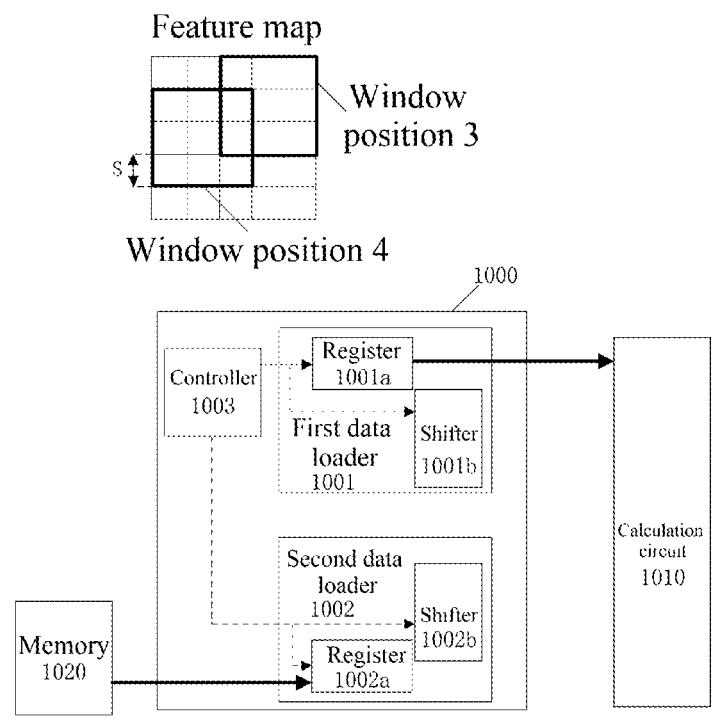

As shown in FIG. 11d, the register 1001a in the first data loader 1001 outputs data in the matrix corresponding to the window at the window position 3 to the calculation circuit 1010, and the register 1002a in the second data loader 1002 reads the data in the matrix corresponding to the window at the window position 4 from the memory 1020.

After it is determined that the first data loader 1001 outputs the data stored therein to the calculation circuit 1010 and the second data loader 1002 has completed the process of reading the data from the memory 1020, the controller 1003 clears the data stored in the register 1001a in the first data loader 1001, controls the first data loader 1001 to switch to the data reading mode, and controls the second data loader 1002 to switch to the data outputting mode. The state of the data loading circuit 1000 is shown in FIG. 11e.

Figure 11E:
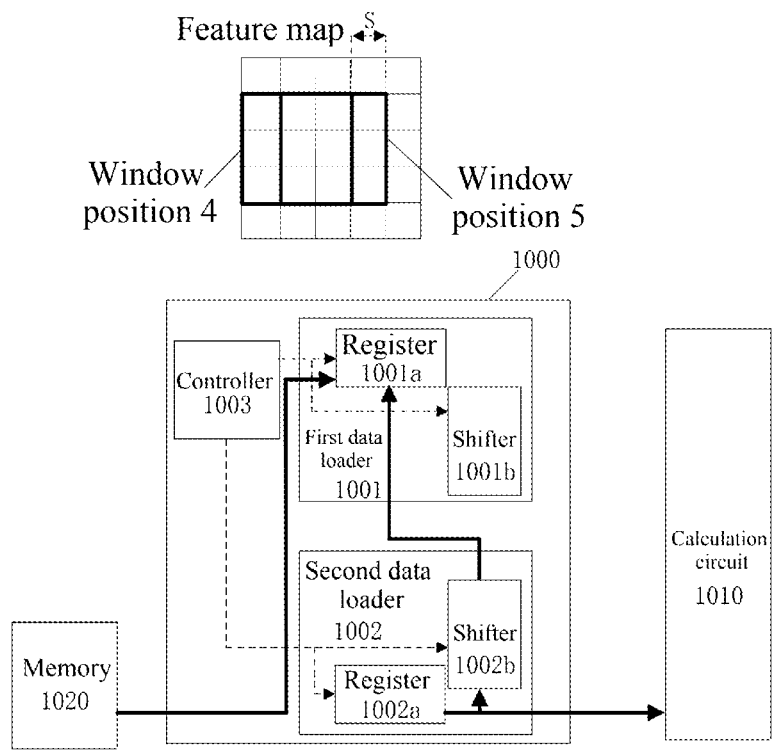

As shown in FIG. 11e, similar to that described with reference to FIG. 11c, the window slides from the window position 4 to a window position 5, the register 1002a in the second data loader 1002 simultaneously outputs the data in the matrix corresponding to the window at the window position 4 to the calculation circuit 1010 and the shifter 1002b in the second data loader, and the shifter 1002b shifts the received data, and outputs, to the register 1001a in the first data loader 1001, the shifted data; and the register 1001a in the first data loader 1001 receives data in the first two columns of a matrix corresponding to the window at the window position 5 from the shifter 1002b, and the register 1001a in the first data loader 1001 reads data in the last column of the matrix corresponding to the window at the window position 5 from the memory 1020.

Figure 11F:
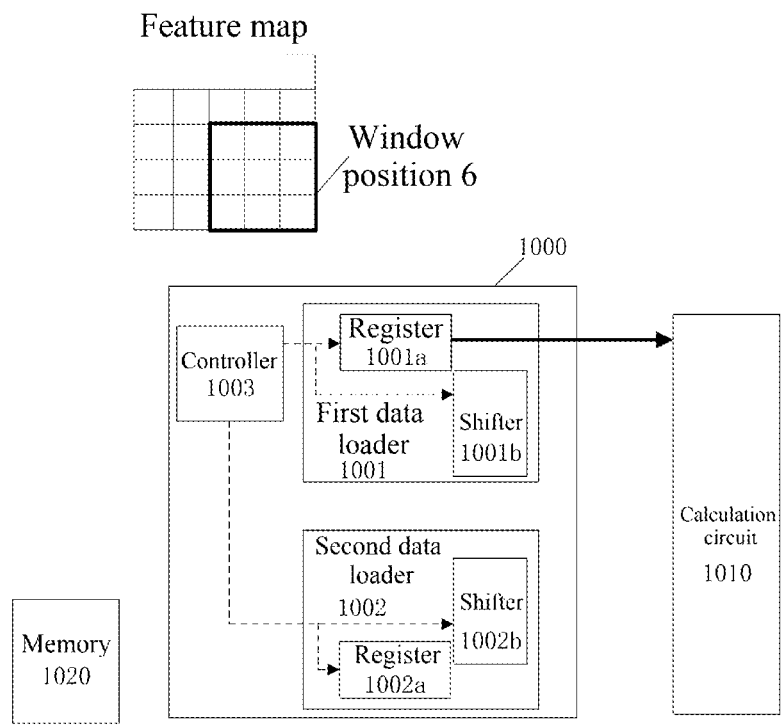

As shown in FIG. 11f, when the window has slid to a window position 6, the window has slid to the end of the feature map. In this case, the register 1001a in the first data loader 1001 outputs data in a matrix corresponding to the window at the window position 6 to the calculation circuit 1010, while the second data loader 1002 neither reads nor outputs data.

According to the embodiment of the present disclosure, the circuit further comprises a multiplexer configured to convey, to the calculation circuit, data output by the data loader in the data outputting mode or in an end-of-row outputting mode.

Figure 12:
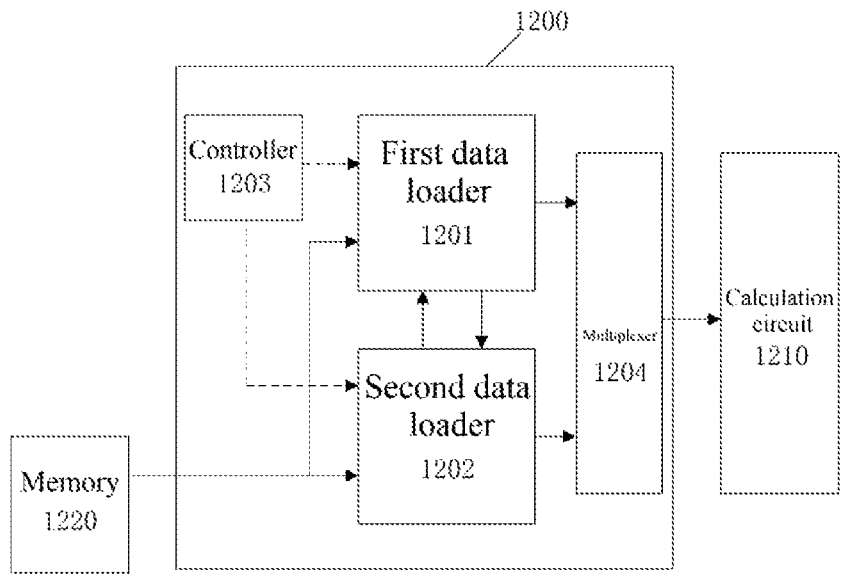
FIG. 12 shows a structural block diagram of a data loading circuit in accordance with some embodiments, such as an exemplary embodiment of the present disclosure.

FIG. 12 shows a structural block diagram of a data loading circuit 1200 in accordance with some embodiments, such as an exemplary embodiment of the present disclosure. The data loading circuit 1200 comprises a first data loader 1201, a second data loader 1202, a controller 1203, and a multiplexer 1204. When a window slides in a feature map, operations of the first data loader 1201, the second data loader 1202, and the controller 1203 are the same as operations of the first data loader 401, the second data loader 402, and the controller 403 described with reference to FIGS. 4 to 5d, or operations of the first data loader 401, the second data loader 402, and the controller 403 described with reference to FIGS. 4, 5a to 5b, and 6a to 6d.

According to some embodiments, when the window slides within K consecutive rows, the multiplexer 1204 conveys, to a calculation circuit 1210, data output by a data loader in a data outputting mode. According to some other embodiments, when the window has slid to the end of the K consecutive rows, the multiplexer 1204 conveys, to the calculation circuit 1210, data output by a data loader in an end-of-row outputting mode.

According to the embodiment of the present disclosure, the data loading circuit is configured to load data for a feature map calculated by a neural network into a calculation circuit, wherein the number of channels of the feature map of the neural network is M, the size of the convolution kernel of the neural network is K*K data, and a window corresponding to the convolution kernel slides at a step of S in the feature map, where M, K and S are positive integers and S<K, the circuit comprising: two registers comprising a first register and a second register, each of the two registers being configured to sequentially store, based on column addresses, data in various columns of a matrix corresponding to the window; two shifters comprising a first shifter and a second shifter, each of the two shifters being configured to shift received data forward by (S*M*K) bits; and a controller configured to: control the first register to be in a data outputting mode and control the second register to be in a data reading mode, when the window slides within K consecutive rows of the feature map, wherein the first register in the data outputting mode is configured to simultaneously output data in the matrix corresponding to the window to the calculation circuit and the first shifter, the first shifter is configured to shift the received data, and output, to the second register in the data reading mode, the shifted data, and the second register in the data reading mode is configured to receive data from the first shifter, and read, from a memory, data in S columns after the matrix corresponding to the window in the K consecutive rows.

According to an embodiment of the present disclosure, the controller is further configured to: determine whether the second register in the data reading mode completes the process of receiving the data from the first shifter and reading the data from the memory, and if so, determine whether the difference between the column address of the last column of the feature map and the column address of the last column of the matrix corresponding to the window is greater than or equal to 2S, and wherein if (e.g., in accordance with a determination by the controller that) the difference between the column address of the last column of the feature map and the column address of the last column of the matrix corresponding to the window is greater than or equal to 2S, data stored in the first register in the data outputting mode is cleared, the first register in the data outputting mode is controlled to switch to the data reading mode, and the second register in the data reading mode is controlled to switch to the data outputting mode.

According to an embodiment of the present disclosure, the second register in the data outputting mode is configured to simultaneously output data in the matrix corresponding to the window to the calculation circuit and the second shifter, the second shifter is configured to shift the received data, and output, to the first register in the data reading mode, the shifted data, and the first register in the data reading mode is configured to receive data from the second shifter, and read, from a memory, data in S columns after the matrix corresponding to the window in the K consecutive rows.

According to an embodiment of the present disclosure, the first shifter and the second shifter are combinational logic circuits.

According to an embodiment of the present disclosure, the first shifter and the second shifter are barrel shifters or logarithmic shifters.

According to an embodiment of the present disclosure, the calculation circuit is a vector-matrix multiplication calculation circuit or a storage and calculation integrated circuit.

Figure 13:
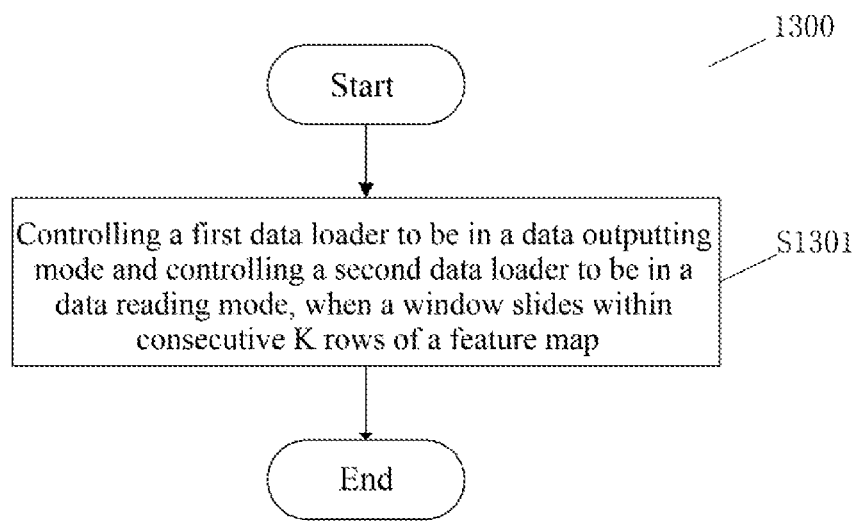
FIG. 13 shows a flow chart of a data loading method in accordance with some embodiments, such as an exemplary embodiment.

FIG. 13 shows a flow chart of a data loading method in accordance with some embodiments, such as an exemplary embodiment. The method comprises loading data for a feature map calculated by a neural network into a calculation circuit, wherein the size of the convolution kernel of the neural network is K*K data, and a window corresponding to the convolution kernel slides at a step of S in the feature map, where K and S are positive integers and S<K.

In step S1301, the first data loader is controlled to be in a data outputting mode and the second data loader is controlled to be in a data reading mode, when the window slides within K consecutive rows of the feature map, wherein the first data loader in the data outputting mode outputs data in a matrix corresponding to the window to the calculation circuit, and outputs data in the last (K−S) columns of the matrix corresponding to the window to the second data loader in the data reading mode, and the second data loader in the data reading mode receives data from the first data loader in the data outputting mode, and reads, from a memory, data in S columns after the matrix corresponding to the window in the K consecutive rows.

According to some embodiments, the method further comprises: determining, after the data loader in the data reading mode completes the process of receiving the data from the data loader in the data outputting mode and reading the data from the memory, whether the difference between the column address of the last column of the feature map and the column address of the last column of the matrix corresponding to the window is greater than or equal to 2S, wherein if (e.g., in accordance with a determination by the controller that) the difference between the column address of the last column of the feature map and the column address of the last column of the matrix corresponding to the window is greater than or equal to 2S, data stored in the first data loader in the data outputting mode is cleared, the first data loader in the data outputting mode is controlled to switch to the data reading mode, and the second data loader in the data reading mode is controlled to switch to the data outputting mode.

According to some embodiments, the method further comprises: if (e.g., in accordance with a determination by the controller that) the difference between the column address of the last column of the feature map and the column address of the last column of the matrix corresponding to the window is less than 2S, clearing the data stored in the first data loader in the data outputting mode, and controlling the second data loader in the data reading mode to switch to an end-of-row outputting mode, wherein the second data loader in the end-of-row outputting mode outputs data stored therein to the calculation circuit.

According to some embodiments, the method further comprises: clearing, after the second data loader in the end-of-row outputting mode completes the process of outputting the data stored therein to the calculation circuit, the data stored in the second data loader in the end-of-row outputting mode; and determining whether the difference between the row address of the last row of the feature map and the row address of the last row of the matrix corresponding to the window is greater than or equal to S, and if so, reselecting the last (K−S) rows in the K consecutive rows and S rows after the K consecutive rows in the feature map, wherein the window starts to slide within the reselected K consecutive rows.

According to some embodiments, the method further comprises: if (e.g., in accordance with a determination by the controller that) the difference between the row address of the last row of the feature map and the row address of the last row of the matrix corresponding to the window is less than S, clearing the data stored in the first data loader and the second data loader.

According to some embodiments, the method further comprises: controlling, when the window starts to slide within the K consecutive rows, one of the first data loader and the second data loader to be in a data pre-reading mode, wherein the data loader in the data pre-reading mode reads the data in the matrix corresponding to the window from the memory; and controlling, the data loader in the data pre-reading mode to switch to the data outputting mode, and controlling the other data loader to switch to the data reading mode, after the data loader in the data pre-reading mode completes the process of reading the data from the memory.

According to some other embodiments, the method further comprises: if (e.g., in accordance with a determination by the controller that) the difference between the column address of the last column of the feature map and the column address of the last column of the matrix corresponding to the window is less than 2S, determining whether the difference between the row address of the last row of the feature map and the row address of the last row of the matrix corresponding to the window is greater than or equal to S, and if so, clearing the data stored in the first data loader in the data outputting mode, controlling the first data loader in the data outputting mode to switch to the data pre-reading mode, and controlling the second data loader in the data reading mode to switch to the end-of-row outputting mode, wherein the first data loader in the data pre-reading mode reads, from the memory, the first K columns in the last (K−S) rows in the K consecutive rows and S rows after the K consecutive rows in the feature map, and the second data loader in the end-of-row outputting mode outputs data stored therein to the calculation circuit.

According to some embodiments, the method further comprises: clearing, after the first data loader in the data pre-reading mode completes the process of reading the data from the memory and the second data loader in the end-of-row outputting mode completes the process of outputting the data stored therein to the calculation circuit, the data stored in the second data loader in the end-of-row outputting mode; reselecting the last (K−S) rows in the K consecutive rows and S rows after the K consecutive rows in the feature map, wherein the window starts to slide within the reselected K consecutive rows; and controlling the first data loader in the data pre-reading mode to switch to the data outputting mode, and controlling the second data loader in the end-of-row outputting mode to switch to the data reading mode.

According to some embodiments, the method further comprises: if (e.g., in accordance with a determination by the controller that) the difference between the row address of the last row of the feature map and the row address of the last row of the matrix corresponding to the window is less than S, controlling the second data loader to switch from the data reading mode to the end-of-row outputting mode; and after the second data loader in the end-of-row outputting mode completes the process of outputting the data stored therein to the calculation circuit, clearing the data stored in the first data loader and the second data loader.

According to some embodiments, the method further comprises: selecting the first K rows of the feature map when the window starts to slide in the feature map, the window then starting to slide within the selected K consecutive rows; controlling one of the two data loaders to be in the data pre-reading mode, wherein the data loader in the data pre-reading mode reads the data in the matrix corresponding to the window from the memory; and, after the data loader in the data pre-reading mode completes the process of reading the data from the memory, controlling the data loader in the data pre-reading mode to switch to the data outputting mode, and controlling the other data loader to switch to the data reading mode.

It should also be appreciated that various variations may be made according to specific requirements. For example, custom hardware may also be used, and/or specific elements may be implemented in hardware, firmware, middleware, microcodes, hardware description languages, or any combination thereof. For example, some or all of the disclosed methods and devices may be implemented by programming hardware (for example, a programmable logic circuit including a field programmable gate array (FPGA) and/or a programmable logic array (PLA)) in an assembly language or a hardware programming language (such as VERILOG, VHDL, and C++) by using the circuit principle and method in consistent with the present disclosure.

Some exemplary aspects of the present disclosure are described below.

Aspect 1. A data loading circuit being configured to load data for a feature map calculated by a neural network into a calculation circuit, wherein the size of the convolution kernel of the neural network is K*K data, and a window corresponding to the convolution kernel slides at a step of S in the feature map, where K and S are positive integers and S<K, the circuit comprising:
  two data loaders comprising a first data loader and a second data loader; and
  a controller configured to:
  control the first data loader to be in a data outputting mode and control the second data loader to be in a data reading mode, when the window slides within K consecutive rows of the feature map,
  wherein the first data loader in the data outputting mode is configured to output data in a matrix corresponding to the window to the calculation circuit, and output data in the last (K−S) columns of the matrix corresponding to the window to the second data loader in the data reading mode, and the second data loader in the data reading mode is configured to receive data from the first data loader in the data outputting mode, and read, from a memory, data in S columns after the matrix corresponding to the window in the K consecutive rows.

Aspect 2. The circuit of Aspect 1, wherein the controller is further configured to:
  determine, after the second data loader in the data reading mode completes the process of receiving the data from the first data loader in the data outputting mode and reading the data from the memory, whether the difference between the column address of the last column of the feature map and the column address of the last column of the matrix corresponding to the window is greater than or equal to 2S,
  wherein if (e.g., in accordance with a determination by the controller that) the difference between the column address of the last column of the feature map and the column address of the last column of the matrix corresponding to the window is greater than or equal to 2S, data stored in the first data loader in the data outputting mode is cleared, the first data loader in the data outputting mode is controlled to switch to the data reading mode, and the second data loader in the data reading mode is controlled to switch to the data outputting mode.

Aspect 3. The circuit of Aspect 2, wherein the controller is further configured to:
  if (e.g., in accordance with a determination by the controller that) the difference between the column address of the last column of the feature map and the column address of the last column of the matrix corresponding to the window is less than 2S, clear the data stored in the first data loader in the data outputting mode, and control the second data loader in the data reading mode to switch to an end-of-row outputting mode, wherein the second data loader in the end-of-row outputting mode outputs data stored therein to the calculation circuit.

Aspect 4. The circuit of Aspect 3, wherein the controller is further configured to:
- after the second data loader in the end-of-row outputting mode completes the process of outputting the data stored therein to the calculation circuit, clear the data stored in the second data loader in the end-of-row outputting mode; and
- determine whether the difference between the row address of the last row of the feature map and the row address of the last row of the matrix corresponding to the window is greater than or equal to S, and if so, reselect K consecutive rows by reselecting the last (K−S) rows in the K consecutive rows and S rows after the K consecutive rows in the feature map, wherein the window starts to slide within the reselected K consecutive rows.

Aspect 5. The circuit of Aspect 4, wherein the controller is further configured to:
- if the difference between the row address of the last row of the feature map and the row address of the last row of the matrix corresponding to the window is less than S, clear the data stored in the first data loader and the second data loader.

Aspect 6. The circuit of Aspect 4, wherein the controller is further configured to:
- control, when the window starts to slide within the K consecutive rows, one of the two data loaders to be in a data pre-reading mode, wherein the data loader in the data pre-reading mode reads the data in the matrix corresponding to the window from the memory; and
- control the data loader in the data pre-reading mode to switch to the data outputting mode, and control the other data loader to switch to the data reading mode, after the data loader in the data pre-reading mode completes the process of reading the data from the memory.

Aspect 7. The circuit of Aspect 2, wherein the controller is further configured to:
- if (e.g., in accordance with a determination by the controller that) the difference between the column address of the last column of the feature map and the column address of the last column of the matrix corresponding to the window is less than 2S, determine whether the difference between the row address of the last row of the feature map and the row address of the last row of the matrix corresponding to the window is greater than or equal to S, and if so, clear the data stored in the first data loader in the data outputting mode, control the first data loader in the data outputting mode to switch to a data pre-reading mode, and control the second data loader in the data reading mode to switch to an end-of-row outputting mode,
- wherein the first data loader in the data pre-reading mode reads, from the memory, the first K columns in the last (K−S) rows in the K consecutive rows and S rows after the K consecutive rows in the feature map, and the second data loader in the end-of-row outputting mode outputs data stored therein to the calculation circuit.

Aspect 8. The circuit of Aspect 7, wherein the controller is further configured to:
- after the first data loader in the data pre-reading mode completes the process of reading the data from the memory and the second data loader in the end-of-row outputting mode completes the process of outputting the data stored therein to the calculation circuit, clear the data stored in the second data loader in the end-of-row outputting mode;
- reselect K consecutive rows by reselecting the last (K−S) rows in the K consecutive rows and S rows after the K consecutive rows in the feature map, wherein the window starts to slide within the reselected K consecutive rows; and
- control the first data loader in the data pre-reading mode to switch to the data outputting mode, and control the second data loader in the end-of-row outputting mode to switch to the data reading mode.

Aspect 9. The circuit of Aspect 7, wherein the controller is further configured to:
- control, if the difference between the row address of the last row of the feature map and the row address of the last row of the matrix corresponding to the window is less than S, the second data loader in the data reading mode to switch to the end-of-row outputting mode; and
- clear, after the second data loader in the end-of-row outputting mode completes the process of outputting the data stored therein to the calculation circuit, the data stored in the first data loader and the second data loader.

Aspect 10. The circuit of Aspect 9, wherein the controller is further configured to:
- select the first K rows of the feature map when the window starts to slide in the feature map, the window then starting to slide within the selected K consecutive rows;
- control one of the two data loaders to be in the data pre-reading mode, wherein the data loader in the data pre-reading mode reads the data in the matrix corresponding to the window from the memory; and
- control the data loader in the data pre-reading mode to switch to the data outputting mode, and control the other data loader to switch to the data reading mode, after the data loader in the data pre-reading mode completes the process of reading the data from the memory.

Aspect 11. The circuit of any one of Aspects 1 to 10, wherein the feature map has M channels, where M is a positive integer, and each of the two data loaders comprises:
- a register configured to sequentially store, based on column addresses, data in columns of the matrix corresponding to the window,
- wherein an output end of the register is coupled to an input end of a corresponding shifter, the shifter being configured to shift received data forward by (S*M*K) bits.

Aspect 12. The circuit of Aspect 11, wherein each of the two data loaders is configured such that
- when the data loader is in the data outputting mode, the register in the data loader is configured to simultaneously output the data in the matrix corresponding to the window to the calculation circuit and the shifter corresponding to the register, wherein the shifter corresponding to the register is configured to shift the received data, and output, to the register in the other data loader, the shifted data; and
- when the data loader is in the data reading mode, the register in the data loader is configured to receive data from the shifter corresponding to the register in the other data loader, and read the data from the memory.

Aspect 13. The circuit of Aspect 12, wherein the shifter is a combinational logic circuit.

Aspect 14. The circuit of Aspect 12, wherein the shifter is a barrel shifter or a logarithmic shifter.

Aspect 15. The circuit of any one of Aspects 3 to 10, wherein the circuit further comprises a multiplexer, and the multiplexer is configured to convey, to the calculation circuit, data output by the data loader in the data outputting mode or in the end-of-row outputting mode.

Aspect 16. The circuit of Aspect 1, wherein the calculation circuit is a vector-matrix multiplication calculation circuit or a storage and calculation integrated circuit.

Aspect 17. A data loading circuit being configured to load data for a feature map calculated by a neural network into a calculation circuit, wherein the number of channels of the feature map of the neural network is M, the size of the convolution kernel of the neural network is K*K data, and a window corresponding to the convolution kernel slides at a step of S in the feature map, where M, K and S are positive integers and S<K, the circuit comprising:
  two registers comprising a first register and a second register, each of the two registers being configured to sequentially store, based on column addresses, data in various columns of a matrix corresponding to the window;
  two shifters comprising a first shifter and a second shifter, each of the two shifters being configured to shift received data forward by (S*M*K) bits; and
  a controller configured to:
  control the first register to be in a data outputting mode and control the second register to be in a data reading mode, when the window slides within K consecutive rows of the feature map,
  wherein the first register in the data outputting mode is configured to simultaneously output data in the matrix corresponding to the window to the calculation circuit and the first shifter, the first shifter is configured to shift the received data, and output, to the second register in the data reading mode, the shifted data, and the second register in the data reading mode is configured to receive data from the first shifter, and read, from a memory, data in S columns after the matrix corresponding to the window in the K consecutive rows.

Aspect 18. The circuit of Aspect 17, wherein the controller is further configured to:
  determine whether the second register in the data reading mode completes the process of receiving the data from the first shifter and reading the data from the memory, and if so, determine whether the difference between the column address of the last column of the feature map and the column address of the last column of the matrix corresponding to the window is greater than or equal to 2S,
  wherein if the difference between the column address of the last column of the feature map and the column address of the last column of the matrix corresponding to the window is greater than or equal to 2S, data stored in the first register in the data outputting mode is cleared, the first register in the data outputting mode is controlled to switch to the data reading mode, and the second register in the data reading mode is controlled to switch to the data outputting mode.

Aspect 19. The circuit of Aspect 18, wherein the second register in the data outputting mode is configured to simultaneously output data in the matrix corresponding to the window to the calculation circuit and the second shifter, the second shifter is configured to shift the received data, and output, to the first register in the data reading mode, the shifted data, and the first register in the data reading mode is configured to receive data from the second shifter, and read, from a memory, data in S columns after the matrix corresponding to the window in the K consecutive rows.

Aspect 20. The data loading circuit of Aspect 17, wherein the first shifter and the second shifter are combinational logic circuits.

Aspect 21. The data loading circuit of Aspect 17, wherein the first shifter and the second shifter are barrel shifters or logarithmic shifters.

Aspect 22. A data loading method, comprising loading data for a feature map calculated by a neural network into a calculation circuit, wherein the size of the convolution kernel of the neural network is K*K data, and a window corresponding to the convolution kernel slides at a step of S in the feature map, where K and S are positive integers and S<K, the method comprising:
  controlling the first data loader to be in a data outputting mode and controlling the second data loader to be in a data reading mode, when the window slides within K consecutive rows of the feature map,
  wherein the first data loader in the data outputting mode outputs data in a matrix corresponding to the window to the calculation circuit, and outputs data in the last (K−S) columns of the matrix corresponding to the window to the second data loader in the data reading mode, and the second data loader in the data reading mode receives data from the first data loader in the data outputting mode, and reads, from a memory, data in S columns after the matrix corresponding to the window in the K consecutive rows.

Aspect 23. The data loading method of Aspect 22, further comprising:
  determining, after the data loader in the data reading mode completes the process of receiving the data from the data loader in the data outputting mode and reading the data from the memory, whether the difference between the column address of the last column of the feature map and the column address of the last column of the matrix corresponding to the window is greater than or equal to 2S,
  wherein if the difference between the column address of the last column of the feature map and the column address of the last column of the matrix corresponding to the window is greater than or equal to 2S, data stored in the first data loader in the data outputting mode is cleared, the first data loader in the data outputting mode is controlled to switch to the data reading mode, and the second data loader in the data reading mode is controlled to switch to the data outputting mode.

Aspect 24. The data loading method of Aspect 23, further comprising:
  if the difference between the column address of the last column of the feature map and the column address of the last column of the matrix corresponding to the window is less than 2S, clearing the data stored in the first data loader in the data outputting mode, and controlling the second data loader in the data reading mode to switch to an end-of-row outputting mode, wherein the second data loader in the end-of-row outputting mode outputs data stored therein to the calculation circuit.

Aspect 25. The data loading method of Aspect 24, further comprising:
  clearing, after the second data loader in the end-of-row outputting mode completes the process of outputting the data stored therein to the calculation circuit, the data stored in the second data loader in the end-of-row outputting mode; and determining whether the difference between the row address of the last row of the feature map and the row address of the last row of the matrix corresponding to the window is greater than or equal to S, and if so, reselecting the last (K−S) rows in the K consecutive rows and S rows after the K consecutive rows in the feature map, wherein the window starts to slide within the reselected K consecutive rows.

Aspect 26. The data loading method of Aspect 23, further comprising:
clearing, if the difference between the row address of the last row of the feature map and the row address of the last row of the matrix corresponding to the window is less than S, the data stored in the first data loader and the second data loader.

Aspect 27. The data loading method of Aspect 25, further comprising:
controlling, when the window starts to slide within the K consecutive rows, one of the first data loader and the second data loader to be in a data pre-reading mode, wherein the data loader in the data pre-reading mode reads the data in the matrix corresponding to the window from the memory; and
controlling the data loader in the data pre-reading mode to switch to the data outputting mode, and controlling the other data loader to switch to the data reading mode, after the data loader in the data pre-reading mode completes the process of reading the data from the memory.

Aspect 28. The data loading method of Aspect 23, further comprising:
if the difference between the column address of the last column of the feature map and the column address of the last column of the matrix corresponding to the window is less than 2S, determining whether the difference between the row address of the last row of the feature map and the row address of the last row of the matrix corresponding to the window is greater than or equal to S, and if so, clearing the data stored in the first data loader in the data outputting mode, control the first data loader in the data outputting mode to switch to a data pre-reading mode, and controlling the second data loader in the data reading mode to switch to an end-of-row outputting mode,
wherein the first data loader in the data pre-reading mode reads, from the memory, the first K columns in the last (K−S) rows in the K consecutive rows and S rows after the K consecutive rows in the feature map, and the second data loader in the end-of-row outputting mode outputs data stored therein to the calculation circuit.

Aspect 29. The data loading method of Aspect 28, further comprising:
clearing, after the first data loader in the data pre-reading mode completes the process of reading the data from the memory and the second data loader in the end-of-row outputting mode completes the process of outputting the data stored therein to the calculation circuit, the data stored in the second data loader in the end-of-row outputting mode;
reselecting the last (K−S) rows in the K consecutive rows and S rows after the K consecutive rows in the feature map, wherein the window starts to slide within the reselected K consecutive rows; and
controlling the first data loader in the data pre-reading mode to switch to the data outputting mode, and controlling the second data loader in the end-of-row outputting mode to switch to the data reading mode.

Aspect 30. The data loading method of Aspect 28, further comprising:
controlling, if the difference between the row address of the last row of the feature map and the row address of the last row of the matrix corresponding to the window is less than S, the second data loader in the data reading mode to switch to the end-of-row outputting mode; and
clearing, after the second data loader in the end-of-row outputting mode completes the process of outputting the data stored therein to the calculation circuit, the data stored in the first data loader and the second data loader.

Aspect 31. The data loading method of Aspect 30, further comprising:
selecting the first K rows of the feature map when the window starts to slide in the feature map, the window then starting to slide within the selected K consecutive rows;
controlling one of the two data loaders to be in the data pre-reading mode, wherein the data loader in the data pre-reading mode reads the data in the matrix corresponding to the window from the memory; and
controlling the data loader in the data pre-reading mode to switch to the data outputting mode, and controlling the other data loader to switch to the data reading mode, after the data loader in the data pre-reading mode completes the process of reading the data from the memory.

Aspect 32. The data loading method of any one of Aspects 22 to 31, wherein the feature map of the neural network has M channels, where M is a positive integer, and each of the first data loader and the second data loader comprises a register, and the method further comprises:
sequentially storing, by the register based on column addresses, data in columns of the matrix corresponding to the window,
wherein an output end of the register is coupled to an input end of a corresponding shifter, the shifter shifting received data forward by (S*M*K) bits.

Aspect 33. The data loading method of Aspect 32, further comprising:
simultaneously outputting, by the register in the data loader for each of the first data loader and the second data loader when the data loader is in the data outputting mode, the data in the matrix corresponding to the window to the calculation circuit and the shifter corresponding to the register, wherein the shifter corresponding to the register is configured to shift the received data, and output, to the register in the other data loader, the shifted data; and
receiving, by the register in the data loader for each of the first data loader and the second data loader when the data loader is in the data reading mode, data from the shifter corresponding to the register in the other data loader, and reading the data from the memory.

Aspect 34. The data loading method of any one of Aspects 24 to 31, further comprising:
conveying, by a multiplexer to the calculation circuit, data output by the data loader in the data outputting mode or in the end-of-row outputting mode.

Although the embodiments or examples of the present disclosure have been described with reference to the accompanying drawings, it should be appreciated that the methods, systems and devices described above are merely exemplary embodiments or examples, and the scope of the present disclosure is not limited by the embodiments or examples, but only defined by the appended authorized claims and equivalent scopes thereof. Various elements in the embodiments or examples may be omitted or substituted by equivalent elements thereof. Moreover, the steps may be executed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A data loading circuit being configured to load data in a feature map into a calculation circuit, wherein the feature map is calculated by a neural network, a size of a convolution kernel of the neural network is K*K data, and a window corresponding to the convolution kernel slides with a step size of S in the feature map, where K and S are positive integers and S<K, the data loading circuit comprising:

two data loaders comprising a first data loader and a second data loader, wherein each data loader comprises a respective hardware component for loading and outputting data; and a controller configured to:
control the first data loader to be in a data outputting mode and control the second data loader to be in a data reading mode, when the window slides within K consecutive rows of the feature map at the step size of S in a width direction,
wherein the first data loader in the data outputting mode is configured to output data in a matrix corresponding to the window to the calculation circuit, and output data in the last (K−S) columns of the matrix corresponding to the window to the second data loader in the data reading mode, and the second data loader in the data reading mode is configured to receive data from the first data loader in the data outputting mode, and read, from a memory, data in S columns after the matrix corresponding to the window in K consecutive rows, and the controller is further configured to:
determine, after the second data loader in the data reading mode completes a process of receiving the data from the first data loader in the data outputting mode and reading the data from the memory, whether a difference between a column address of the last column of the feature map and a column address of the last column of the matrix corresponding to the window is greater than or equal to 2S; and
in accordance with a determination that the difference between the column address of the last column of the feature map and the column address of the last column of the matrix corresponding to the window is greater than or equal to 2S, clear data stored in the first data loader, switch the first data loader from the data outputting mode to the data reading mode, and switch the second data loader from the data reading mode to the data outputting mode.

2. The data loading circuit of claim 1, wherein the controller is further configured to:
in accordance with a determination that the difference between the column address of the last column of the feature map and the column address of the last column of the matrix corresponding to the window is less than 2S, clear the data stored in the first data loader in the data outputting mode, and switch the second data loader from the data reading mode to an end-of-row outputting mode, wherein the second data loader in the end-of-row outputting mode outputs data stored therein to the calculation circuit.

3. The data loading circuit of claim 2, wherein the controller is further configured to:
after the second data loader in the end-of-row outputting mode completes a process of outputting the data stored therein to the calculation circuit, clear the data stored in the second data loader in the end-of-row outputting mode; and
determine whether a difference between a row address of the last row of the feature map and a row address of the last row of the matrix corresponding to the window is greater than or equal to S, and if so, reselect K consecutive rows by reselecting the last (K−S) rows in the K consecutive rows and S rows after the K consecutive rows in the feature map, wherein the window starts to slide within the reselected K consecutive rows.

4. The data loading circuit of claim 3, wherein the controller is further configured to:
if the difference between the row address of the last row of the feature map and the row address of the last row of the matrix corresponding to the window is less than S, clear the data stored in the first data loader and the second data loader.

5. The data loading circuit of claim 3, wherein the controller is further configured to:
when the window starts to slide within the K consecutive rows, control one of the two data loaders to be in a data pre-reading mode, wherein the data loader in the data pre-reading mode reads the data in the matrix corresponding to the window from the memory; and
control the data loader in the data pre-reading mode to switch to the data outputting mode, and control the other data loader of the two data loaders to switch to the data reading mode, after the data loader in the data pre-reading mode completes a process of reading the data from the memory.

6. The data loading circuit of claim 1, wherein the controller is further configured to:
if the difference between the column address of the last column of the feature map and the column address of the last column of the matrix corresponding to the window is less than 2S, determine whether the difference between the row address of the last row of the feature map and the row address of the last row of the matrix corresponding to the window is greater than or equal to S, and if so, clear the data stored in the first data loader in the data outputting mode, switch the first data loader from the data outputting mode to a data pre-reading mode, and switch the second data loader from the data reading mode to an end-of-row outputting mode,
wherein the first data loader in the data pre-reading mode reads, from the memory, the first K columns in the last (K−S) rows in the K consecutive rows and S rows after the K consecutive rows in the feature map, and the second data loader in the end-of-row outputting mode outputs data stored therein to the calculation circuit.

7. The data loading circuit of claim 6, wherein the controller is further configured to:
clear, after the first data loader in the data pre-reading mode completes a process of reading the data from the memory and the second data loader in the end-of-row outputting mode completes a process of outputting the data stored therein to the calculation circuit, the data stored in the second data loader in the end-of-row outputting mode;

reselect K consecutive rows by reselecting the last (K−S) rows in the K consecutive rows and S rows after the K consecutive rows in the feature map, wherein the window starts to slide within the reselected K consecutive rows; and switch the first data loader from the data pre-reading mode to the data outputting mode, and switch the second data loader from the end-of-row outputting mode to the data reading mode.

8. The data loading circuit of claim 6, wherein the controller is further configured to:
in accordance with a determination that the difference between the row address of the last row of the feature map and the row address of the last row of the matrix corresponding to the window is less than S, switch the second data loader from the data reading mode to the end-of-row outputting mode; and
after the second data loader in the end-of-row outputting mode completes a process of outputting the data stored therein to the calculation circuit, clear the data stored in the first data loader and the second data loader.

9. The data loading circuit of claim 8, wherein the controller is further configured to:
select the first K consecutive rows of the feature map when the window starts to slide in the feature map, the window then starting to slide within the selected K consecutive rows;
control one of the two data loaders to be in the data pre-reading mode, wherein the data loader in the data pre-reading mode reads the data in the matrix corresponding to the window from the memory; and
after the data loader in the data pre-reading mode completes a process of reading the data from the memory, control the data loader in the data pre-reading mode to switch to the data outputting mode, and control the other data loader of the two data loaders to switch to the data reading mode.

10. The data loading circuit of claim 6, wherein the data loading circuit further comprises a multiplexer, and the multiplexer is configured to convey, to the calculation circuit, data output by the data loader in the data outputting mode or in the end-of-row outputting mode.

11. The data loading circuit of claim 1, wherein the feature map has M channels, where M is a positive integer, and each respective data loader of the two data loaders comprises:
a register configured to sequentially store, based on column addresses, data in columns of the matrix corresponding to the window,
wherein an output end of the register is coupled to an input end of a corresponding shifter, the shifter being configured to shift received data forward by (S*M*K) bits.

12. The data loading circuit of claim 11, wherein each respective data loader of the two data loaders is configured such that:
when the respective data loader is in the data outputting mode, the register in the respective data loader is configured to simultaneously output the data in the matrix corresponding to the window to the calculation circuit and the shifter corresponding to the register, wherein the shifter corresponding to the register is configured to shift the received data, and output, to the register in the other data loader of the two data loaders, the shifted data; and when the respective data loader is in the data reading mode, the register in the respective data loader is configured to receive data from the shifter corresponding to the register in the other data loader of the two data loaders, and read the data from the memory.

13. The data loading circuit of claim 12, wherein the shifter is a combinational logic circuit.

14. The data loading circuit of claim 12, wherein the shifter is a barrel shifter or a logarithmic shifter.

15. The data loading circuit of claim 1, wherein the calculation circuit is a vector-matrix multiplication calculation circuit or a storage and calculation integrated circuit.

16. A data loading circuit configured to load data in a feature map into a calculation circuit, wherein the feature map is calculated by a neural network, the feature map of the neural network has M channels, the size of a convolution kernel of the neural network is K*K data, and a window corresponding to the convolution kernel slides with a step size of S in the feature map, where M, K and S are positive integers and S<K, the data loading circuit comprising:
two registers comprising a first register and a second register, each of the two registers being configured to sequentially store, based on column addresses, data in various columns of a matrix corresponding to the window;
two shifters comprising a first shifter and a second shifter, each of the two shifters being configured to shift received data forward by (S*M*K) bits; and
a controller configured to:
control the first register to be in a data outputting mode and control the second register to be in a data reading mode, when the window slides within K consecutive rows of the feature map at the step size of S in a width direction,
wherein the first register in the data outputting mode is configured to simultaneously output data in the matrix corresponding to the window to the calculation circuit and the first shifter, the first shifter is configured to shift the received data, and output, to the second register in the data reading mode, the shifted data, and the second register in the data reading mode is configured to receive data from the first shifter, and read, from a memory, data in S columns after the matrix corresponding to the window in the K consecutive rows, and
the controller is further configured to:
determine whether the second register in the data reading mode completes a process of receiving the data from the first shifter and reading the data from the memory, and if so, determine whether a difference between a column address of the last column of the feature map and a column address of the last column of the matrix corresponding to the window is greater than or equal to 2S,
wherein if the difference between the column address of the last column of the feature map and the column address of the last column of the matrix corresponding to the window is greater than or equal to 2S, data stored in the first register in the data outputting mode is cleared, the first register in the data outputting mode is controlled to switch to the data reading mode, and the second register in the data reading mode is controlled to switch to the data outputting mode.

17. The data loading circuit of claim 16, wherein the second register in the data outputting mode is configured to simultaneously output data in the matrix corresponding to the window to the calculation circuit and the second shifter, the second shifter is configured to shift the received data, and output, to the first register in the data reading mode, the shifted data, and the first register in the data reading mode is configured to receive data from the second shifter, and read, from a memory, data in S columns after the matrix corresponding to the window in the K consecutive rows.

18. A data loading method, comprising loading data in a feature map into a calculation circuit, wherein the feature map is calculated by a neural network, and the size of a convolution kernel of the neural network is K*K data, and a window corresponding to the convolution kernel slides with a step size of S in the feature map, where K and S are positive integers and S<K, the method comprising:

controlling a first data loader to be in a data outputting mode and controlling a second data loader to be in a data reading mode, when the window slides within K consecutive rows of the feature map at the step size of S in a width direction, wherein each of the first data loader and the second data loader comprises a respective hardware component for loading and outputting data, wherein the first data loader in the data outputting mode outputs data in a matrix corresponding to the window to the calculation circuit, and outputs data in the last (K−S) columns of the matrix corresponding to the window to the second data loader in the data reading mode, and the second data loader in the data reading mode receives data from the first data loader in the data outputting mode, and reads, from a memory, data in S columns after the matrix corresponding to the window in the K consecutive rows, and the method further comprising:

determining, after the second data loader in the data reading mode completes a process of receiving the data from the first data loader in the data outputting mode and reading the data from the memory, whether a difference between a column address of the last column of the feature map and a column address of the last column of the matrix corresponding to the window is greater than or equal to 2S, wherein if the difference between the column address of the last column of the feature map and the column address of the last column of the matrix corresponding to the window is greater than or equal to 2S, data stored in the first data loader in the data outputting mode is cleared, the first data loader in the data outputting mode is controlled to switch to the data reading mode, and the second data loader in the data reading mode is controlled to switch to the data outputting mode.

* * * * *